United States Patent [19]

Weyer

[11] Patent Number: 4,846,007
[45] Date of Patent: * Jul. 11, 1989

[54] FLUID-POWER DEVICE USING AXIALLY OFFSET ROLLERS

[76] Inventor: Paul P. Weyer, 48811 - 128th Ave. SE., Enumclaw, Wash. 98022

[*] Notice: The portion of the term of this patent subsequent to May 3, 2005 has been disclaimed.

[21] Appl. No.: 931,223

[22] Filed: Nov. 14, 1986

Related U.S. Application Data

[63] Continuation-in-part of Ser. No. 881,904, Jul. 3, 1986, Pat. No. 4,741,250, which is a continuation-in-part of Ser. No. 662,256, Oct. 17, 1984, Pat. No. 4,667,528, which is a continuation-in-part of Ser. No. 692,293, Jan. 17, 1985, Pat. No. 4,683,767, which is a continuation-in-part of Ser. No. 803,954, Dec. 2, 1985, Pat. No. 4,691,582, which is a continuation-in-part of Ser. No. 575,228, Jan. 30, 1984, Pat. No. 4,590,816.

[51] Int. Cl.$^4$ .................... F01B 3/00; F16H 25/24
[52] U.S. Cl. ................. 74/89.15; 74/424.8 C; 74/424.8 R; 74/441; 92/2; 92/33
[58] Field of Search ......... 74/89.15, 424.8 B, 424.8 C, 74/424.8 R, 441, 458, 459; 92/2, 31, 33; 277/136, 137, DIG. 7, DIG. 9; 384/504; 403/355, 356, 359

[56] References Cited

U.S. PATENT DOCUMENTS

| | | | |
|---|---|---|---|
| 717,897 | 1/1903 | Gurney | 384/504 |
| 2,067,357 | 1/1937 | Terry | 74/424.8 |
| 2,131,151 | 9/1938 | Smith | 74/424.8 C |
| 2,482,082 | 9/1949 | Wahlborg | 74/424.8 C |
| 2,488,256 | 11/1949 | Anderson | 74/424.8 C |
| 2,525,326 | 10/1950 | Wahlmark | 74/424.8 C |
| 2,751,789 | 6/1956 | Orinick | 74/424.8 C |
| 2,791,128 | 5/1957 | Geyer et al. | 74/441 |
| 2,945,387 | 7/1960 | Geyer | 74/89 |
| 2,959,064 | 11/1960 | Geyer et al. | 74/441 |

(List continued on next page.)

FOREIGN PATENT DOCUMENTS

| | | |
|---|---|---|
| 2260300 | 6/1974 | Fed. Rep. of Germany . |
| 2803459 | 8/1979 | Fed. Rep. of Germany . |
| 2807952 | 8/1979 | Fed. Rep. of Germany . |
| 3144306 | 7/1981 | Fed. Rep. of Germany . |
| 1496924 | 10/1967 | France . |
| 93721 | 12/1967 | France . |
| 1450855 | 5/1969 | France . |
| 399084 | 10/1942 | Italy ............... 74/424.8 C |
| 81/01440 | 5/1981 | PCT Int'l Appl. ......... 92/33 |
| 386809 | 4/1965 | Switzerland . |
| 406747 | 1/1966 | Switzerland . |
| 890440 | 2/1962 | United Kingdom . |
| 136401 | 8/1974 | United Kingdom . |

OTHER PUBLICATIONS

Spiracon Brochure—Planetary Roller Screws, A Unique Innovation in Mechanical Linear Actuators, A 4 page Brochure, (undated).

Moscow Bauman Tech. Coll., Week 84/20 Issued Jun. 27, 84, A one Pg., Description.

Mechanisms, Linkages and Mechanical Controls, By Chironis, A 4 Page Brochure.

*Primary Examiner*—Leslie A. Braun
*Assistant Examiner*—Scott Anchell
*Attorney, Agent, or Firm*—Seed and Berry

[57] ABSTRACT

A fluid-powered device having a body with interior helical grooves, an output shaft with exterior helical grooves, a plurality of rollers having circumferential grooves, and an axially reciprocating piston sleeve mounted within the body and retaining the rollers in axially offset and nested relation to each other and in fixed axial and circumferential position relative to the piston sleeve during powered operation of the device. The rollers are retained by the sleeve portion of the piston sleeve in circumferentially distributed arrangement between the grooved body and shaft surface portion in seated engagement with the grooved body and in seated engagement with the grooved output shaft for transmitting force between the body, output shaft and piston sleeve.

43 Claims, 8 Drawing Sheets

U.S. PATENT DOCUMENTS

| | | | |
|---|---|---|---|
| 3,020,775 | 2/1962 | Musser | 74/440 |
| 3,128,634 | 4/1964 | Eastman | 74/424.8 |
| 3,165,007 | 1/1965 | Neubarth | 74/424.8 B |
| 3,187,592 | 6/1965 | Geyer | 74/89 |
| 3,255,806 | 6/1966 | Meyer et al. | 160/188 |
| 3,295,385 | 1/1967 | Jenny | 74/424.8 B |
| 3,333,483 | 9/1967 | Maci et al. | 74/424.8 |
| 3,406,584 | 10/1968 | Roantree | 74/424.8 |
| 3,508,452 | 4/1970 | Roantree | 74/424.8 |
| 3,554,457 | 1/1971 | Hutzenlaub | 384/504 |
| 3,577,796 | 5/1971 | Eissfeldt | 74/459 |
| 3,585,869 | 6/1971 | Lemor | 74/89.15 |
| 3,595,094 | 7/1971 | Lemor | 74/89.14 |
| 3,638,507 | 2/1972 | Orner | 74/424.8 |
| 3,670,583 | 6/1972 | Leming | 74/89.15 |
| 3,847,033 | 11/1974 | Toth | 74/459 |
| 3,861,226 | 1/1975 | Stanley | 74/89.15 |
| 3,965,761 | 6/1976 | Stanley | 74/89.15 |
| 4,022,076 | 5/1977 | Metz | 74/441 |
| 4,033,194 | 7/1977 | Stanley | 74/89.15 |
| 4,036,074 | 7/1977 | Bodnar | 74/409 |
| 4,050,319 | 9/1977 | Stanley | 74/89.15 |
| 4,276,003 | 6/1981 | Perkins et al. | 417/415 |
| 4,313,367 | 2/1982 | Weyer | 92/33 |
| 4,369,011 | 1/1983 | Ploss | 411/223 |
| 4,409,888 | 10/1983 | Weyer | 92/31 |
| 4,425,009 | 1/1984 | Tillon et al. | 384/504 |
| 4,493,614 | 1/1985 | Chu et al. | 417/22 |
| 4,576,057 | 3/1986 | Saari | 74/424.8 |
| 4,590,816 | 5/1986 | Weyer | 92/33 |
| 4,603,616 | 8/1986 | Zajac | 92/33 |
| 4,741,250 | 5/1988 | Weyer | 92/33 |

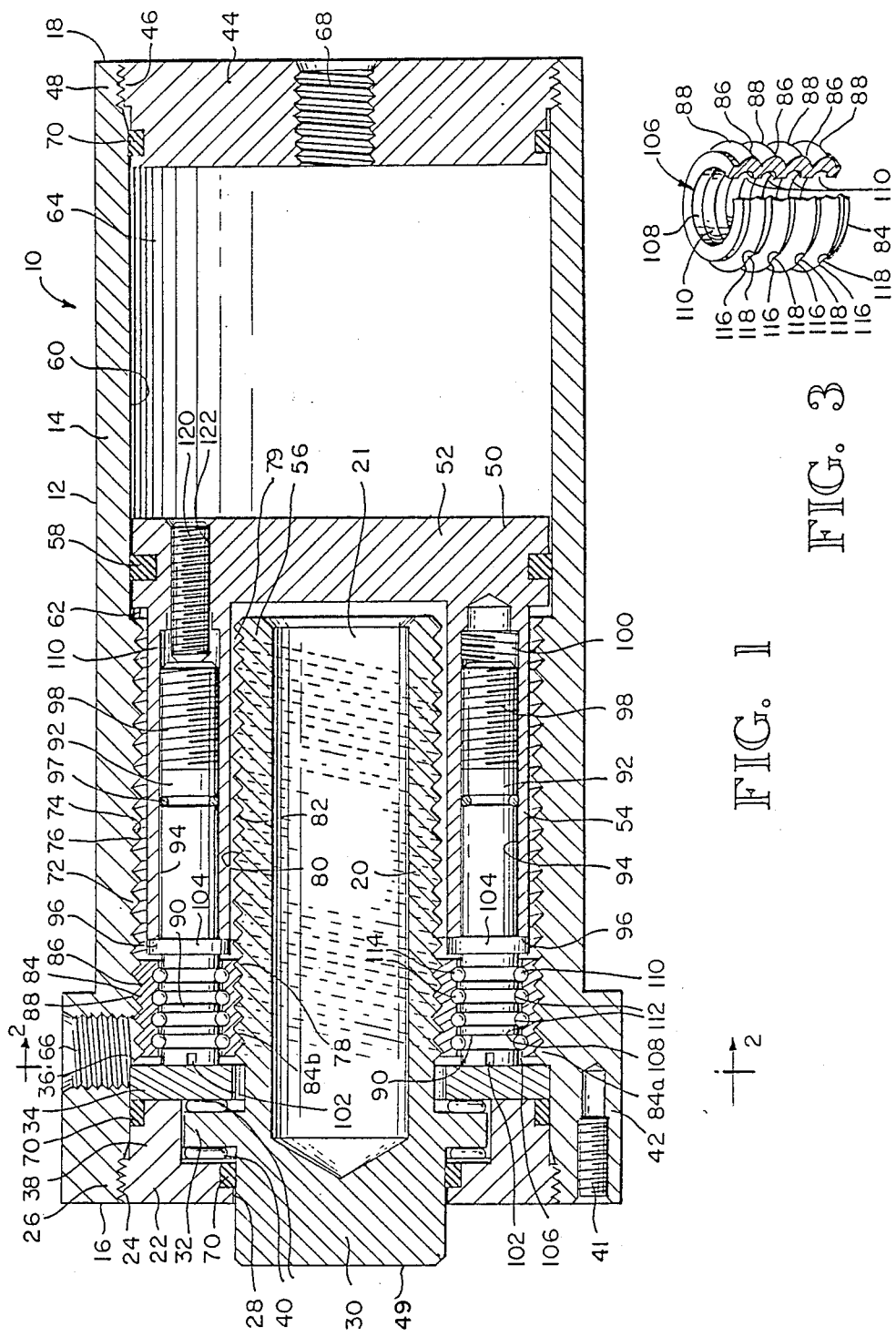
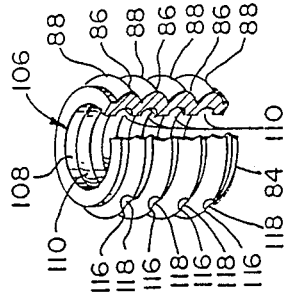
FIG. 1
FIG. 3

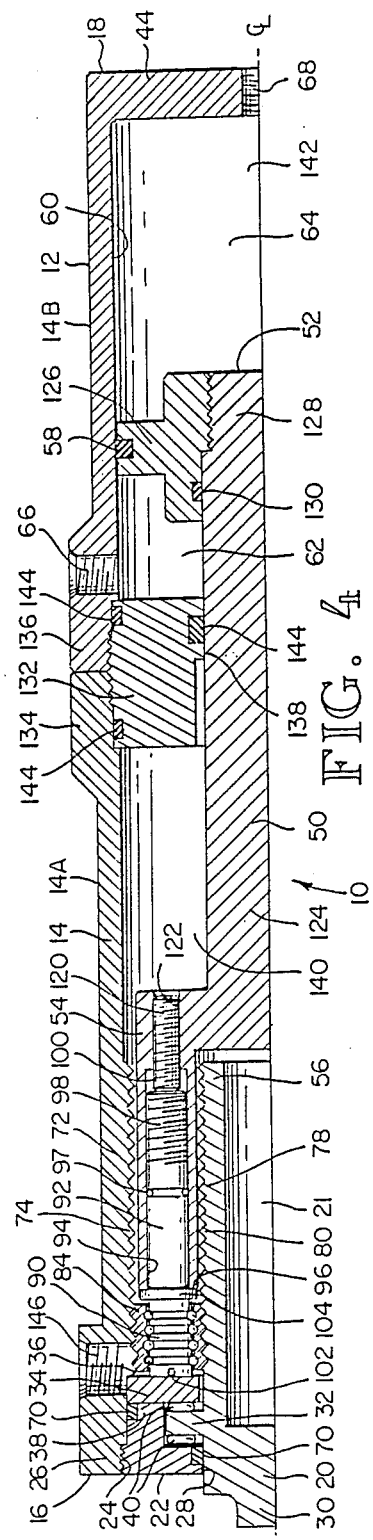
FIG. 4
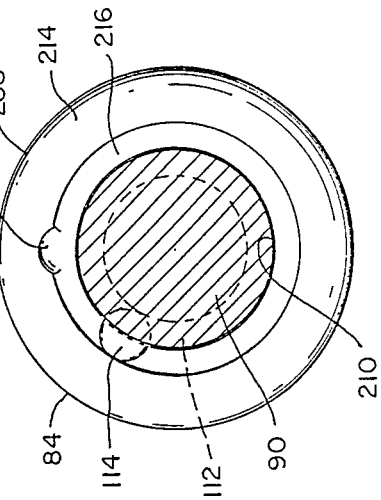
FIG. 10
FIG. 9

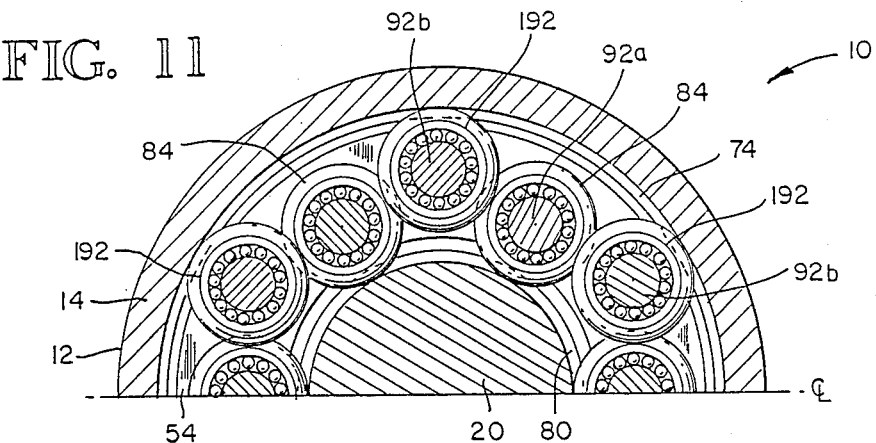
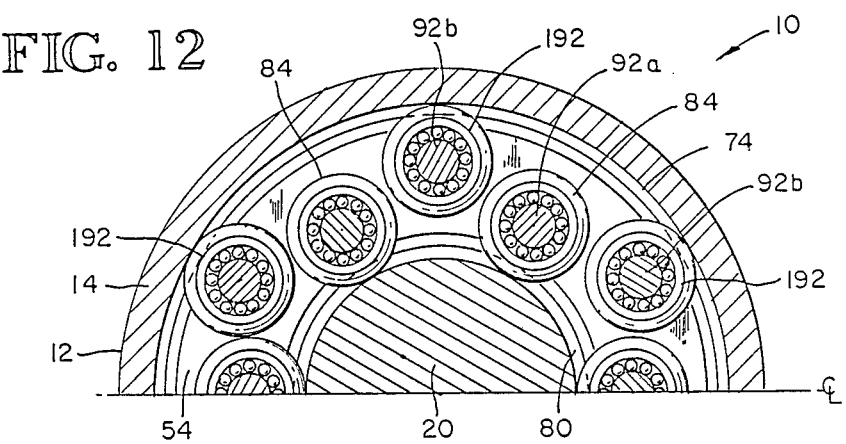
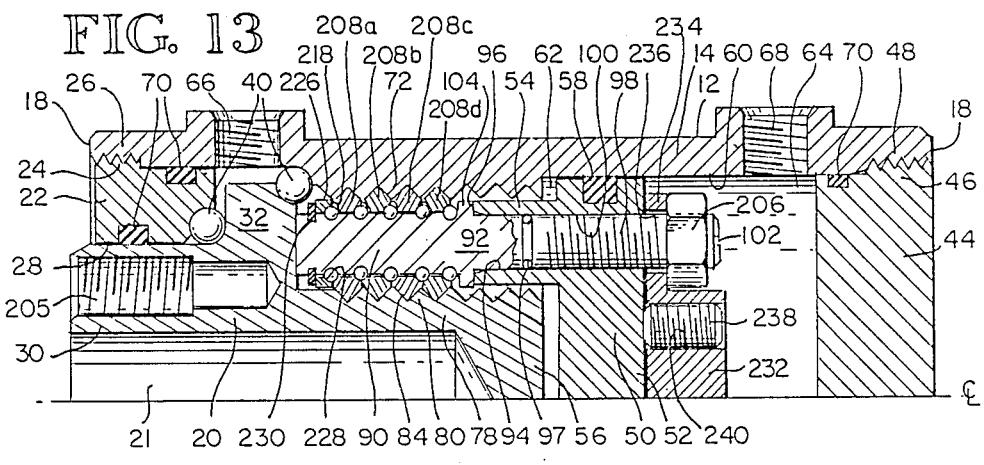

FLUID-POWER DEVICE USING AXIALLY OFFSET ROLLERS

CROSS-REFERENCES TO RELATED APPLICATIONS

This is a continuation-in-part application of application U.S. Ser. No. 881,904, filed July 3, 1986, now issued as U.S. Pat. No. 4,741,250 which is a continuation-in-part of applications U.S. Ser. No. 662,256, filed Oct. 17, 1984, now issued as U.S. Pat. No. 4,667,528, U.S. Ser. No. 692,293, filed Jan. 17, 1985, now issued as U.S. Pat. No. 4,683,767 and U.S. Ser. No. 803,954, filed Dec. 2, 1985, now issued as U.S. Pat. No. 4,691,582 which are continuation-in-part applications of application U.S. Ser. No. 575,228, filed Jan. 30, 1984, now issued as U.S. Pat. No. 4,590,816.

TECHNICAL FIELD

The present invention relates generally to actuators and other fluid power devices such as pumps, and more particularly, to fluid-power devices of the type in which axial movement of a piston results in or is produced by relative rotational or linear movement between a body and an output member.

BACKGROUND OF THE INVENTION

Rotary helical splined actuators have been employed in the past to achieve the advantage of hightorque output from a simple linear piston-and-cylinder drive arrangement. The actuator typically uses a cylindrical body with an elongated rotary output shaft extending coaxially within the body, with an end portion of the shaft providing the drive output. An elongated piston sleeve is disposed between the body and the shaft and coaxially receives the shaft therein. The piston sleeve has a sleeve portion splined to cooperate with corresponding splines on the body interior and the output shaft exterior. The piston sleeve is reciprocally mounted within the body and has a head for the application of fluid pressure to one or the other opposing sides thereof to produce axial movement of the piston sleeve. As the piston sleeve linearly reciprocates in an axial direction within the body, the outer splines of the sleeve portion engage the splines of the body to cause rotation of the sleeve portion. The resulting linear and rotational movement of the sleeve portion is transmitted through the inner splines of the sleeve portion to the splines of the shaft to cause the shaft to rotate. Bearings are typically supplied to rotatably support one or both ends of the shaft relative to the body.

While such an arrangement produces a relatively high-torque output, the capability of the actuator is inherently limited by the use of splines. Splines having certain characteristic )imitations relating to the number of turns, pitch, surface contact drag and free play between the corresponding splines which limit the axial and radial loads that the shaft can be subjected to and the operating efficiency of the actuator. For high-torque, high-efficiency applications, the rigid splined helical actuators have been found to have an undesirably high frictional coefficient and large loads can cause binding between the corresponding spline. While actuators using balls to transmit torque have been manufactured and are an improvement upon the splined actuator, further improvement is desirable.

It will therefore be appreciated that there has been a significant need for a fluid-powered actuator and other devices such as pumps which are capable of handling increased axial and radial shaft loads while decreasing the weight and size of the device and decreasing the difficulty and expense of manufacturing the device. The device should have a low friction design to increase efficiency, an uncomplicated and strong design to increase reliability, and be usable for heavy duty applications. Preferably the device will provide a higher output efficiency by using force transmission components producing rolling friction which is less than the sliding friction of splines. At least some embodiments should provide backlash elimination adjustment means to reduce the need for exceptionally accurate machining, to facilitate easy assembly of the device, and to eliminate the slack that produces backlash after the device is assembled. The present invention fulfills these needs and further provides other related advantages.

DISCLOSURE OF THE INVENTION

The present invention resides in a fluid-power device, with a body having a plurality of helical grooves with ridges therebetween formed on an inward facing surface portion thereof; an axially extending drive member supported for rotational or axial movement relative to the body and connectable to an external device, the drive member having a plurality of helical grooves with ridges therebetween formed on an outward facing surface portion thereof positioned within the body generally confronting the grooved body inward surface portion; a plurality of elongated rollers having circumferential grooves with ridges therebetween; and an axially reciprocating member reciprocally mounted within the body and rotatably retaining the rollers in fixed axial and circumferential position relative to the reciprocating member during powered operation of the device. The rollers are retained by the reciprocating member in a circumferentially distributed arrangement between the grooved body inward surface portion and the grooved drive member outward surface portion with at least a first plurality of the rollers in seated engagement with the grooved body inward surface portion and at least a second plurality of the rollers in seated engagement with the grooved drive member outward surface portion fr transmitting force between the body, drive member and reciprocating member. Circumferentially. adjacent ones of the first plurality of rollers are axially offset relative to each other and circumferentially adjacent ones of the second plurality of rollers are axially offset relative to each other. The device further includes at least one piston mounted for reciprocal movement and operatively engaging the reciprocating member.

In one embodiment the drive member helical grooves have a hand turn opposite the hand turn of the body helical grooves, and have substantially the same axial pitch as the body helical grooves. The roller grooves have an axial pitch corresponding to the axial pitch of the body and drive member helical grooves. Each of the rollers in the first and second pluralities of rollers are in seated engagement with both the grooved body and.-drive member surface portions.

In another embodiment of the invention, the first and second pluralities of rollers are in fixed radial and circumferential position relative to the reciprocating member with the second rollers being radially positioned inward of the first rollers and spaced away from the grooved body inward surface portion to engage the grooved drive member outward surface portion, and the first rollers being radially positioned spaced away from the grooved drive member outward surface portion to engage the grooved body inward surface portion. The second rollers having an axial pitch corresponding to the axial pitch of the drive member helical grooves and the first rollers having an axial pitch corresponding to the axial pitch of the body helical grooves. The first plurality of rollers may be in seated engagement with the second plurality of rolers, with the first and second rollers having a corresponding axial pitch. One variation has the first or second rollers attached to the reciprocating member, and the other of the first or second rollers are detached from the reciprocating member and held in a nested position by adjacent pairs of the other rollers. The detached rollers are fixed axially and circumferentially relative to the reciprocating member by the engaged adjacent pairs of rollers. In another variation of this embodiment, the rollers of the first and second pluralities of rollers are spaced apart and out of engagement with each other.

The number of the plurality of drive member and body helical grooves are each equal to about 1.5 times the number of equally spaced circumferentially adjacent positions for rollers for engagement therewith. In the preferred embodiment, the rollers are circumferentially spaced apart with substantially equal inter-roller spacing therebetween, and the circumferentially adjacent rollers are axially offset relative to each other by 0.5 times the axial pitch of the grooved surfaces the rollers engage. Moreover, the adjacent rollers are circumferentially positioned in generally nested arrangement with each other and circumferentially spaced apart sufficient to be out of driving engagement with each other.

The lead of the body helical grooves and the drive member helical grooves are selected substantially according to the relationship: groove lead = groove axial pitch × number of grooves.

The reciprocating member includes a plurality of spindles extending into a circumferential space between the grooved body and drive member surface portions and circumferentially distributed therein about the drive member. The spindles are arranged in substantially parallel axial alignment with the body and each has at least one of the rollers coaxially and rotatably retained thereon and restrained against axial movement relative to the spindles. The spindles are retained by the reciprocating member to prevent axial movement of the spindle relative to the reciprocating member during powered operation of the device and are axially offset to accomplish the axial offsetting of the spindles. Spacer means are provided to axially offset adjacent spindles.

The rollers retained on the spindles each have a longitudinally extending substantially coaxial roller bore therethrough rotatably receiving one of the spindles. The axial bore is defined by an interior sidewall, and corresponding ones of the roller bore sidewalls and spindles having formed thereon a plurality of confronting and corresponding ball races defining a plurality of ball channels extending circumferentially thereabout. The device further includes a plurality of balls seated in the ball channels to restrict axial movement of the rollers relative to the spindles while permitting free rotation of the rollers on the spindles.

In certain embodiments each of the rollers is defined by a plurality of rings disposed on the spindle in juxtaposition. Each of the rings has a radially outward facing surface portion shaped to form in combination with the other of the plurality of rings the roller grooves and ridges. The rings having first and second axially outward oppositely facing sidewalls, each with an axially outward opening circumferential ball groove formed thereon. The first and second sidewall ball grooves are axially spaced apart so that the ring ball grooves on adjacent first and second ring sidewalls of adjacent pairs of the rings define one of the roller ball races. The rings further include a ball loading opening in the ring second sidewall connecting with the second sidewall ball grooves. The opening is sized to receive and pass balls into the ball channel defined by the ring second sidewall ball groove and the corresponding one of the spindle ball races when the ring is positioned on the spindle with the first sidewall ball groove engaging the balls in the corresponding one of the spindle ball races. The first ring sidewall is sized to block the ball loading opening of an adjacent ring to prevent balls from exiting when in operative position on the spindle.

Each of the spindles may be supported by a coaxially extending support arm. The reciprocating member includes a sleeve portion having a plurality of circumferentially spaced apart and axially extending bore holes therein, and the spindle support arms are disposed in the sleeve bore holes. At least one or more of the spindle support arms is selectively and adjustably axially movable in the sleeve bore holes. The device further includes means for selectively and adjustably axially moving the movable spindle support arms in an axial direction relative to the others of the spindle support arms within at least a limited range to axially move the rollers rotatably retained on the movable spindles relative to the rollers rotatably retained on the other of the spindles to eliminate backlash. The movable spindle support arms and the sleeve portion bore holes are correspondingly threaded, and the movable spindle support arms are adjustably axially moved by rotation thereof. The device further includes lock means for locking the movable spindle support arms against rotation during powered operation of the device.

Other features and advantages of the invention will become apparent from the following detailed description, taken in conjunction with accompanying drawings.

BRIEF DESCRIPTION OF THE DRAWINGS

FIG. 1 is a side elevational, sectional view of a fluid-powered roller rotary actuator embodying the present invention, taken substantially along the line 1—1 of FIG. 2.

FIG. 3 is an isometric view of a circumferentially grooved roller of the type used in the actuator of FIG. 1.

FIG. 4 is a partial side elevational, sectional view of an alternative embodiment of the invention similar to the embodiment of FIG. 1 but with the fluid compartments separated from the force-transmitting parts.

FIG. 9 is an enlarged, fragmentary side elevational, partially sectional view of a roller of the type used in the actuator of FIG. 7.

FIG. 10 is a sectional view taken substantially along the line 9—9 of FIG. 9.

FIG. 11 is a partial end elevational, sectional view of an alternative embodiment of the actuator of FIG. 7 using engaged idler and main rollers.

FIG. 12 is a partial end elevational, sectional view of yet another alternative embodiment of the actuator of FIG. 7 using disengaged idler and main rollers.

FIG. 13 is a partial side elevational, sectional view of an alternative embodiment of the invention using a locking end plate.

BEST MODE FOR CARRYING OUT THE INVENTION

Figure 2:
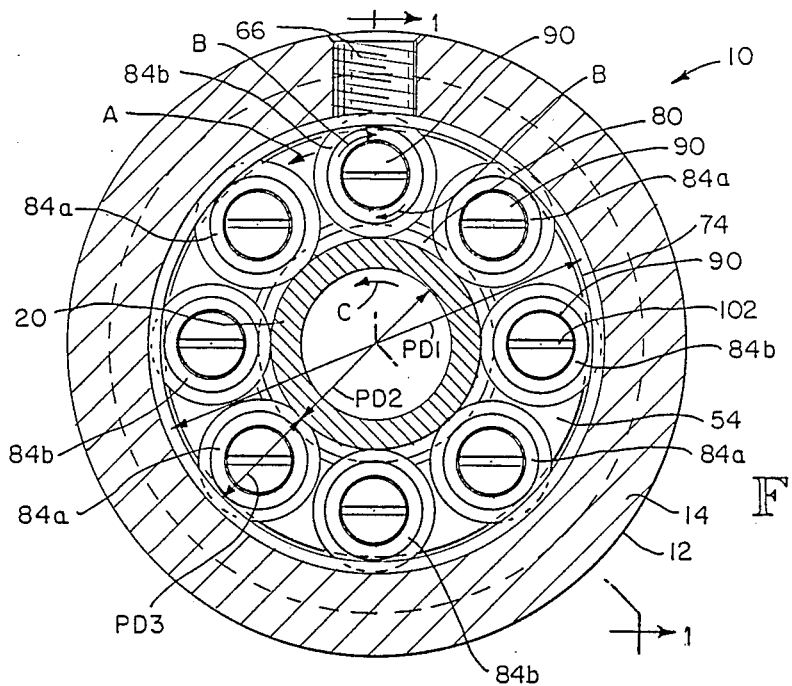
FIG. 2 is a sectional view of the actuator taken substantially along the line 2—2 of FIG. 1.

As shown in the drawings for purposes of illustration, the present invention is embodied in a fluid-power device. A first embodiment of the device is a rotary actuator 10 shown in FIGS. 1 and 2. The actuator 10 includes an elongated housing or body 12 having a cylindrical sidewall 14 and first and second ends 6 and 18, respectively. An elongated rotary output shaft 0 having a hollow center bore 21 is coaxially positioned within the body 12 and supported for rotation relative to the body.

An annular first end cap 22 is positioned at th first body end 16 and has a threaded outer perimeter portion 24 threadably attached to a threaded end portion 26 of the body 12. The first end cap 22 has a central aperture° 28 to receive an axially outward end portion 30 of the shaft 20. The shaft 20 has a radially outward extending flange portion 32 positioned toward the first body end 16 between the end cap 22 and a stop ring 34. The stop ring 34 is held in place in the body 12 against axial movement by an interior axially outward facing stop shoulder 36 of the body and an axially inward projecting cylindrical flange portion 38 of the first end cap 22. The shaft 20 is rotatably held in place against axially thrust by thrust bearings 40 disposed between the shaft flange portion 32 and the stop ring 34 and between the shaft flange portion and the end cap flange portion 38. A second end cap 44 is positioned at the second body end 18 and has a threaded outer perimeter portion 46 threadably attached to a threaded end portion 48 of the body 12.

The shaft end portion 30 has a splined shaft extension 49 for coupling to an external device (not shown), however, any conventional means of attachment may be used. The body 12 is adapted for attachment to a stationary support frame (not shown), by a plurality of threaded recesses 41 circumferentially spaced about a radially outward flanged portion 42 of the body sidewall 14. It is to be understood that the invention may be practiced with the shaft 20 rotatably driving an external device, or with the shaft being held stationary and the rotational drive being provided by rotation of the body 12.

A piston sleeve 50 is coaxially and reciprocally mounted within the body 12 coaxially about the shaft 20. The piston sleeve 50 has a head portion 52 positioned toward the second body end 18, and a cylindrical sleeve portion 54 fixedly attached to the head portion and extending axially therefrom toward the first body end 16. The shaft 20 has an axially inward end portion 56 which extends axially toward the second body end 18 to within the sleeve portion 54, but terminates short of the head portion 52.

The head portion 52 carries conventional seals 58, disposed between the head portion and a corresponding interior smooth wall portion 60 of the body sidewall to define fluid-tight compartments 62 and 64 to each side of the head portion toward the first body end 16 and the second body end 18, respectively. The smooth sidewall portion 60 of the body sidewall has sufficient axial length to accommodate the full stroke of the head portion 2 within the body 12.

Reciprocation of the piston sleeve 50 within the body 12 occurs when hydraulic fluid or air under pressure selectively enters through one or the other of a port 66 located in the sidewall 14 and a port 68 located in the second end cap 44. As used herein "fluid" will refer to hydraulic oil, air or any other fluid suitable for use in the actuator 10. The ports 66 and 68 each communicates with one of the fluid-tight compartments 62 and 64, respectively. Conventional seals 70 are disposed between the first and second end caps 22 and 44 and the body 12 and between the shaft end portion 30 and the first end cap 2 to prevent fluid leakage from the compartments.

The application of fluid pressure to the compartment 62 produces axial movement of the piston sleeve 50 toward the second body end 18. The application of fluid pressure to the compartment 64 produces axial movement of the piston sleeve 50 toward the first body end 16. The actuator 10 provides relative rotational movement between the body 12 and the shaft 20 through the conversion of linear movement of the piston sleeve 50 into rotational movement of the shaft, as will be described in more detail below.

An inward facing surface portion 72 of the body sidewall 14 toward the first body end 16 has cut therein a plurality of helical grooves 74 having the same lead angle and a uniform lead and axial pitch. The helical body grooves 74 extend about the sidewall 14 and have helical ridges 76 therebetween.

An outward facing surface portion 78 of the shaft end portion 56 has cut therein a plurality of helical grooves 80 having the same lead angle and a uniform lead and axial pitch. The helical shaft grooves 80 extend about the shaft 20 and have helical ridges 82 therebetween. The outward shaft surface portion 78 is located generally opposite the grooved inward body surface portion 72 and spaced apart radially inward therefrom to define a circumferential space 79 therebetween.

The helical body grooves 74 have an opposite hand or direction of turn from the helical shaft grooves 80, but have substantially the same axial pitch as the helical shaft grooves 80. In the embodiment of FIG. 1, the helical body grooves 74 are left hand, and the helical shaft grooves 80 are right hand. As will be discussed in more detail below, the number of grooves or groove starts comprising the plurality of helical body and shaft grooves 74 and 80 varies from design to design, but preferably the numbers used are interrelated. The grooved inward body surface portion 72 has a first pitch diameter (PD1) and a first lead (L1), and the grooved outward shaft surface portion 78 has a second pitch diameter (PD2) and a second lead (L2), with the pitch diameters and helical groove leads sized substantially according to the relationship:

$$\frac{PD1}{PD2} = \frac{L1}{L2}$$

This relationship causes free rolling of a plurality of rollers 84 disposed in the circumferential space 79, as will be described below, in that the shaft rotation which results from the planetary action precisely matches the shaft rotation which results from the rollers rolling along the helical body and shaft grooves 74 and 80. While this design is preferred since it eliminates any scuffing or slippage of the rollers 84 as the actuator 10 operates, and thus eliminates sliding friction and achieves the benefit of rolling friction, the actuator may be manufactured without the components perfectly matched, such that while the rollers do roll they also tend to slide somewhat.

As used herein "lead angle" is the helix angle of a helical groove, "lead" is the linear advance resulting from one full revolution along a helical groove, "pitch" is the axial distance between adjacent helical grooves, and "pitch diameter" is the diameter of the grooved part measured from the groove half-depth position.

The actuator 10 is provided with a set of elongated force transmitting rollers 84 disposed in a circumferentially aligned row in the circumferential space 79 between the grooved inward body surface portion 72 and the grooved outward shaft surface portion 78. As best shown in FIG. 3, the rollers 84 each have cut in the outward facing surface thereof a plurality of circumferential grooves 86 with circumferential ridges 88 therebetween. The circumferential grooves 86 extend about the roller 84 in parallel spaced apart radial planes. The circumferential grooves 86 of the rollers 84 have substantially the same axial pitch as the helical body and shaft grooves 74 and 80. The rollers 84 have a pitch diameter (PD3) sized based upon the first pitch diameter PD1 of the grooved inward body surface portion 72 and the second pitch diameter PD2 of the grooved outward shaft surface portion 78, substantially according to the relationship:

$$PD3 = \frac{PD1 - PD2}{2}$$

The relationship of the pitch diameters is best illustrated in FIG. 2.

If desired, the circumferential grooves 86 and ridges 88 of the rollers 84 may be axially spaced apart to skip certain of the helical body and shaft grooves 74 and 80. When using rollers with the same axial position within the actuator (i.e., with the corresponding ridges 88 of each roller in the same plane), the number of grooves on the shaft must be equal to the number of rollers or must be an integer multiple thereof, assuming the rollers are circumferentially distributed with equal inter-roller spacing. For example, if there are eight rollers or at least eight equally spaced roller positions, the shaft must have 8, 16, 24 or 32 grooves, etc. In any event, the groove spacing of the roller must correspond to the axial pitch or groove spacing of the shaft and body with which the roller grooves mesh. As will be described below, in alternative embodiments shown in FIGS. 14, 15 and 16, the rollers 84 may be axially offset to permit further flexibility in the selection of the number of shaft and body grooves which can be used for a particular number of rollers.

The rollers 84 are rotatably retained in fixed axial and circumferential position relative to the piston sleeve 50 as the piston sleeve reciprocates within the body 12 during fluid-powered operation of the actuator 10 by a plurality of cylindrical shaft spindles 90. Each of the spindles 90 has a coaxially extending and integrally formed support arm portion 92. The support arm portions 92 are disposed in a plurality of bore holes 94 formed in an axially outward end wall 96 of the sleeve portion 54 facing toward the first body end 16. The bore holes 94 are evenly circumferentially spaced-apart about the sleeve portion 54 and axially extending fully through the sleeve portion 54 and the head portion 52, and O-ring seals 97 are provided in grooves in the support arm portions 92 to prevent fluid leakage between the compartments 62 and 64.

The support arm portion 92 has an exterior threaded end portion 98 threadably received in an interior threaded end portion 100 of its corresponding bore hole 94. The support arm threaded end portion 98 may be threaded into the bore hole threaded end portion 100 by turning the spindle 90 using a slot 102 cut in the axial end face thereof. The support arm portion 92 has a radially outward extending flange 104 which engages the sleeve portion end wall 96 when the support arm portion is fully threaded into the bore hole 94. As will be described below, certain of the support arm portions 92 are adjusted so as to not be fully seated against the flange 104 for backlash elimination purposes.

The spindles 90 project into the circumferential space 79 and hold the rollers 84 restrained against axial movement relative to the spindles for rotation about the spindles on axes in parallel axial alignment with the body 12. The spindles 90 also retain the rollers 84 in circumferentially distributed, spaced apart positions within the circumferential space 79 about the shaft 20 with each of the rollers in seated engagement and coacting with the helical body grooves 74 and the helical shaft grooves 80 for transmitting force between the body 12, the shaft 20 and the piston sleeve 50. Each ridge 88 of the rollers 84 is positioned for rolling travel in corresponding grooves of both the helical body grooves 74 and the helical shaft grooves 80, and the corresponding ridges 88 of adjacent rollers are axially positioned in generally the same plane. As will be described below, in alternative embodiments the rollers can be axially offset from one another.

The spindles 90 are arranged in parallel axial alignment with the body 12 and each have one of the roller 84 coaxially and rotatably retained thereon and restrained against axial movement relative to the spindle. The rollers 84 each have a longitudinally extending coaxial roller bore 106 therethrough for rotatably receiving one of the spindles 90. The axial roller bore 106 is defined by an interior sidewall 108, and the corresponding roller bore sidewall and spindle exterior surface have formed thereon a plurality of confronting and corresponding ball races 110 and 112, respectively, defining a plurality of ball channels extending circumferentially thereabout.

A plurality of balls 114 are seated in each of the ball channels formed by the ball races 110 and 112 to prevent axial movement of the roller 84 relative to the spindle 90 against axial thrust encountered during powered operation while permitting free rotation of the roller on the spindle. Preferably, the circumferential roller ball races 110 are formed on the roller bore sidewall 108 radially inward from and axially positioned corresponding to the circumferential roller ridges 88 so that the cutting of the roller ball races does not adversely affect the roller strength. A sufficient number of balls and ball channels must be used to handle extremely large axial loads encountered during operation. The balls 114 can be inserted into the ball channels with the rollers 84 positioned on the spindles 90 using a ball filler hole 116 extending radially through each of the roller ridges 88 and communicating with the corresponding ball race 110. After a sufficient number of balls 114 are inserted through the filler hole 116 to fill the ball race 110, a sealer plug 118 is inserted into the hole to prevent passage of the balls out of the hole during operation of the actuator 10.

As will now be described, linear reciprocation of the piston sleeve 50 produces rotation of the piston sleeve and the shaft 20 through the force-transmitting capability of the rollers 84. As the piston sleeve 50 linearly reciprocates between one or the other axial directions within the body 12 through application of fluid pressure to the fluid-tight compartments 62 and 64, torque is transmitted by the rollers 84 to the piston sleeve 50 through their coaction with the helical body grooves 74. The axial force created by fluid pressure on the head portion 52 causes the rollers to roll along the helical body grooves 74 and transmit torque to the piston sleeve 50. The transmitted torque causes the piston sleeve 50 to rotate as it moves axially. By way of example, since the helical body grooves 74 are left hand, the piston sleeve 50 rotates counterclockwise when viewed from the first body end 16 as the piston sleeve moves fromthe first body end to the second body end 18 when fluid pressure is applied to the compartment 62 through the port 66, as shown by arrow A in FIG. 2. As the piston sleeve 50 rotates counterclockwise, the rollers 84 roll along the helical body grooves 74 and themselves rotate clockwise, as shown by arrow B.

The resulting linear and rotational movement of the piston sleeve 50 transmits both axial and rotational force to the shaft 20 through the coaction of the rollers 84 with the helical shaft grooves 80. The transmitted force causes the shaft 20 to rotate relative to the body 12 since axial movement of the shaft is restricted by the thrust bearings 40. As such, axial movement of the piston sleeve 50 produced by fluid pressure is converted into relative rotational movement between the body 12 and the shaft 20. The resulting movement when viewed from the body ends is much like the movement of a planetary gear arrangement.

Continuing the example discussed above, since the helical shaft grooves 80 are right hand, the axial movement of the piston sleeve 50 toward the second body end 18 causes the shaft 20 to rotate counter clockwise relative to the piston sleeve, as shown by arrow C in FIG. 2. As the shaft 20 rotates counterclockwise, the rollers 84 roll along helical shaft grooves 80 with a clockwise rotation. Since this is the same roller rotation as caused by the rollers rolling along the helical body grooves 74, no scuffing or slippage of the rollers occurs and the advantage of rolling friction rather than sliding friction is enjoyed. As noted above, since both the piston sleeve 50 and the shaft 20 rotate counterclockwise in response to the application of fluid pressure to the compartment 62, the resulting relative rotation between the body 12 and the shaft is the sum of the rotation of the piston sleeve relative to the body and the rotation of the shaft relative to the piston sleeve.

It is noted that the rotational directions described above are merely reversed when the piston sleeve 50 moves from the second body end 18 to the first body end 16 when fluid pressure is applied to the compartment 64 through the port 68. It is further noted that it is necessary to utilize the opposite hand turn for the helical body and shaft grooves with the embodiment of the invention shown in FIG. 1 to avoid the rollers 84 scuffing or slipping as a result of the rollers tending to rotate in one direction due to the piston sleeve rotation and opposite direction due to the shaft rotation. If the rollers do not roll with the surfaces they engage, they will slide with respect to the surface and produce disadvantageous sliding friction much like that of splines. Thus, the sometimes advantageous arrangement of using the same hand turn for the helical body and shaft grooves to produce differential rotation is not possible while achieving the benefit of rolling friction. This problem has, however, been overcome in alternative embodiments of the invention shown in FIGS. 7, 11 and 12 which will be described in detail below.

Still referring to lhe embodiment of FIG. 1, the actuator 10 is provided with means for eliminating backlash in the force-transmitting parts and for axially preloading of the piston sleeve 50 and the rollers 84. Backlash results for the slack or free movement between the force-transmitting parts of the actuator. The slack is usually due to the sizing of the grooves of the body 12, piston sleeve 50, and shaft 20, and the rollers 84 positioned therein, which transmit force between the body and the shaft through the piston sleeve. Backlash occurs as the piston sleeve 50 moves from one axial direction to the other within the body as it reciprocates. As previously described, the spindle support arm portion 92 has a threaded end portion 98 threadably received in an interior threaded end portion 100 of the sleeve bore hole 94. Circumferentially alternate support arm portions 92 are fully threaded into the sleeve 54 with the flange in seated engagement with the sleeve portion end wall 96, and not moved. Preferably every other of the support arm portions 92 is intended to be selectively and adjustably movable in their sleeve bore holes 94 for the purpose of backlash elimination prior to commencing fluid powered operation. The adjusting axial movement of every other of the support arm portions 92, and thus the spindles 90 extending therefrom and the rollers 84 rotatably retained thereby, relative to the stationary support arm portions, and thus the spindles extending therefrom and the rollers rotatably retained thereby, tends to eliminate backlash by reducing the slack between the rollers and the helical body and shaft grooves 74 and 80 which coact with the rollers. When all slack between either the rollers and the helical body grooves or the rollers and the shaft grooves has been eliminated, further axial adjustment will apply an axial preloading force on the piston sleeve and the rollers.

The rollers 84 associated with the support arm portions 92 which are maintained stationary with respect to the piston sleeve 50 are designated in FIGS. 1 and 2 by the reference numeral 84a, while the rollers associated with the support arm portions which are adjustably moved with respect to the piston sleeve to eliminate backlash are designated 84b. To lock the support arm portions 92 in position once axially adjusted to eliminate backlash, each adjusted support arm portion is provided with a locking set screw 120 extending through a threaded bore hole 122 in the head portion 52 and into the sleeve bore hole 94. The set screw 120 engages and applies an axial outward locking force to the end of the support arm portion 92. Should usage of the actuator 10 cause wear of the grooves or the rollers seated therein, or should slack occur for any other reason, the slack can be removed in the same manner described above by further axial adjustment of the support arm portions.

With the present invention, the grooves may be machined using conventional machining techniques with standard tolerances, and the slack which creates the backlash problem can be eliminated by adjustment prior to fluid-powered operation of the actuator 10. Furthermore the grooves can be machined with a size to permit easy assembly of the actuator and the slack thereby introduced can be eliminated by adjustment. It is noted that the backlash elimination described will eliminate an equal amount of slack between the rollers and the helical body and between the rollers and the shaft grooves.

For purposes of illustration, two example designs for an actuator 10 according to the present invention are provided.

EXAMPLE 1

In this first example, a body pitch diameter PD1 of 2.875 inches and a shaft pitch diameter PD2 of 1.437 inches (for a 2:1 ratio), both having an axial pitch (P) of 0.1875 inches are selected. Use of 8 rollers and 8 helical shaft grooves 80 are also selected. These values and the number of shaft groove starts and rollers can be varied, however, unless the rollers are axially offset it is mandatory to utilize the same number of shaft grooves as rollers used assuming circumferential distribution of rollers with equal inter-roller spacing, or to utilize as the number of shaft grooves an integer multiple of the number of rollers used. Since the rollers and the helical body and shaft grooves intermesh, the rollers must have the same axial pitch as the body and shaft grooves.

As noted above, the pitch diameter of the rollers is sized according to the relationship:

$$PD3 = \frac{PD1 - PD2}{2}$$

and hence the roller pitch diameter PD3 is $$\frac{2.875 - 1.437}{2} = .719 \text{ inches.}$$

Since 8 helical shaft grooves 80 are to be used, the shaft lead L2 is $$8 \times P = 8 \times 0.1875 = 1.500 \text{ inches.}$$

As also noted above, the pitch diameter and leads of the body and shaft are sized according to the relationship $$\frac{PD1}{PD2} = \frac{L1}{L2}$$

and hence the body lead L1 is $$1.500 \times \frac{2.875}{1.437} = 3.000 \text{ inches.}$$

The number of helical body grooves 74 is therefore equal to:

$$\text{number of shaft grooves} \times \frac{PD1}{PD2} = 8 \times \frac{3}{1.500} = 16$$

As noted above, with the coplanar arrangement of rollers, it is necessary to utilize as the number of helical body grooves 74 an integer multiple of the number of equally spaced roller positions used. Here 8 rollers were selected and thus the number of helical body grooves are twice the number of rollers. It is noted that less than eight rollers can be used leaving one or more of the roller positions vacant, but this would reduce the load carrying ability of the actuator.

With an actuator of the design of example 1, the helical shaft grooves 80 have a lead angle equal to $$\tan^{-1}\left(\frac{L2}{PD2 \times Pi}\right) = \tan^{-1}\left(\frac{1.500}{1.437 \times Pi}\right) = 18.38°$$

and the helical body grooves 74 have the same lead angle $$\tan^{-1}\left(\frac{L1}{PD1 \times Pi}\right) = \tan^{-1}\left(\frac{3.000}{2.875 \times Pi}\right) = 18.38°$$

Since the hand turn of the helical body and shaft grooves 74 and 80 are opposite, the rotation produced is added, and for a one inch piston sleeve stroke (ST) the resultant shaft rotation is equal to:

$$ST \times \left(\frac{1}{L1} + \frac{1}{L2}\right) \times 360° =$$

$$1'' \times \left(\frac{1}{3.000} + \frac{1}{1.500}\right) \times 360° = 360°$$

Or alternatieely, for a shaft rotation of 180° the stroke would be 0.500 inches.

EXAMPLE 2

In this second example, a body pitch diameter PDI of 10.500 inches, a shaft pitch diameter PD2 of 7.000 inches (for a 3:2 ratio), and an axial pitch P of 0.250 inches are selected. Use of 14 rollers and 28 helical shaft grooves are also selected (a multiple of 2). The pitch diameter of the rollers PD3 is $$\frac{PD1 - PD2}{2} = \frac{10.500 - 7.000}{2} = 1.750 \text{ inches.}$$

The shaft lead L2 is $$28 \times 0.250 = 7.000 \text{ inches.}$$

The body lead L1 is $$7.000 \times \frac{10.500}{7.000} = 10.500 \text{ inches}$$

The number of helical body grooves 74 is therefore equal to $$\frac{L1}{P} = \frac{10.500}{.250} = 42$$

which is a multiple of 3 times the 14 rollers being used. The helical shaft and body grooves 80 and 74 have the same lead angle equal to $$\tan^{-1}\left(\frac{L2}{PD2 \times Pi}\right) = \tan^{-1}\left(\frac{7.000}{7.000 \times Pi}\right) = 17.657°$$

The rotation produced for a one inch piston sleeve stroke (ST) is equal to $$ST \times \left(\frac{1}{L1} + \frac{1}{L2}\right) \times 360° = 1'' \times \left(\frac{1}{10.500} + \frac{1}{7.000}\right) \times 360° = 85.71°$$

Or alternate, for a shaft rotation of 180°, the stroke would be 2.100 inches.

A significant advantage with the present invention is the reduction in machining time and cost by utilizing helical grooves 74 and 80 only on the body 12 and the shaft 20, rather than the four helical grooved surfaces required for force transmission using conventional helical splines or ball races. Cutting of grooves on the piston sleeve 50 has been completely eliminated. As such, the number of helical grooves which must be cut with the expensive and slow precision equipment required to cut helical grooves are reduced, thus reducing the expense and time of manufacture. Moreover, the roller 84 can be simply turned on a lathe to cut their circumferential grooves 86. By utilizing backlash elimination, the parts need not be manufactured to extremely close tolerances, further reducing the expense of manufacture.

In addition to transmitting force, the use of the rollers 84 permit increased axial and radial loading of the shaft 20 when compared with similarly constructed and sized splined actuators, and even ball actuators using balls for force transmission. The increased load carrying ability results, at least in part, from the increased surface contact the rollers provide between themselves and the grooved surfaces of the body and shaft they engage to distribute load. The increased surface contact also results in an actuator of shorter length when compared to a ball actuator of the same load rating since to achieve the same surface contact as provided by a roller, a string of balls must be used with a length much longer than the axial length of the roller. There is also a savings in length when compared with certain ball actuator designs since the rollers travel axially with the piston sleeve and do not require the use of extended length grooves to avoid ball scuffing for adeqaate performance.

The rollers 84 of the present invention achieve the benefit of reduced friction by using rolling friction, as do balls, rather than the sliding friction of splines, yet the friction reduction over splines can be achieved with rollers using less axial length than balls. Moreover, since the surface contact for rollers is spread over a greater area than with balls, the walls of the grooves with which the rollers coact can be cut thinner while still retaining adequate strength. This also allows the grooves to be placed closer together for more dense packing of the rollers than can be achieved than with balls. As a result of these benefits, the overall actuator weight can be reduced compared to a ball actuator of equivalent power rating and a more reliable actuator produced.

Compared to splines, the rollers also provide the benefit of serving as roller bearing to reduce frictional drag and to provide aligning support for the body, piston sleeve and shaft. This facilitates easy shaft rotation and reduces shaft binding under extreme loads.

It is to be understood that while the described embodiment of FIG. 1, as well as all embodiments of the invention which will be described hereinafter are described as fluid-powered rotary actuators, devices of the same general construction utilizing the invention may be manufactured for use as linear actuators, fluid pumps, shock absorbers and the like. In the situation of a linear actuator, the shaft 20 is partially or completely restrained against rotation but permitted to move axially relative to the body 12 in response to reciprocation of the piston sleeve 50. In the situations of pumps or shock absorbers, the shaft 20 is rotated as the input member and the resulting reciprocal movement of the piston sleeve 50 causes the head portion 52 to pump fluid through the ports 66 and 68.

For ease of understanding, the components of the alternative embodiments of the invention described hereinafter will be similarly numbered with those of the first embodiment when of a similar construction. Only the differences in construction will be described in detail.

An alternative embodiment of the invention very similar to the embodiment of FIG. 1 is shown in FIG. 4. In this embodiment, the piston sleeve 50 has an elongated, axially extending neck portion 124 extending between the sleeve portion 54 and the head portion 52. The head portion 52 is formed in two pieces, and includes an interiorly threaded ring 126 threadably attached to an exteriorly threaded end portion 128 of the piston sleeve neck 124. The piston head ring 126 carries the seal 58, and a seal 130 is provided between the ring and the neck portion 124 to prevent fluid leakage.

In the embodiment of FIG. 4, the cylindrical sidewall 14 is formed in two parts 14A and 14B securely connected together in fixed relation by an interiorly positioned annular connector plug 132. The connector plug 132 has exterior threads which are threadably attached to a threaded end portion 134 of the sidewall part 14A and a threaded end portion 136 of the sidewall part 14B. The plug 132 has a central aperture 138 through which the neck portion 124 of the piston sleeve 50 slides as the piston sleeve reciprocates. The plug 132 divides the interior of the body 12 into a first chamber 140 to a side of the plug toward the first body end 16 within which the sleeve portion 54 and the spindle 92/roller 84 assembly i positioned, and a second chamber 142 to a side of the plug toward the second body end 18 within which the head portion 52 is positioned. The plug 132 has conventional seals 144 disposed between the plug and the sidewall parts 14A and 14B, and between the plug and the piston sleeve neck portion 124.

The fist body chamber 142 is divided by the head portion 52 into the two fluid-tight compartments 62 and 64 with which the ports 66 and 68 communicate. The compartments 62 and 64 are sealed from the second body chamber 140 by the plug 132 and seals 144 to prevent the fluid used to power the actuator 10 from entering the first chamber 140. A port 146 is provided to the first chamber 140 for applying lubrication oil or grease to the force-transmitting compartments contained therein. Except for the separation of the fluid compartment 62 and 64 from the force-transmitting parts, and several other minor changes, the actuator 10 of FIG. 4 is structurally and operatively identical to the actuator of FIG. 1.

Figure 6:
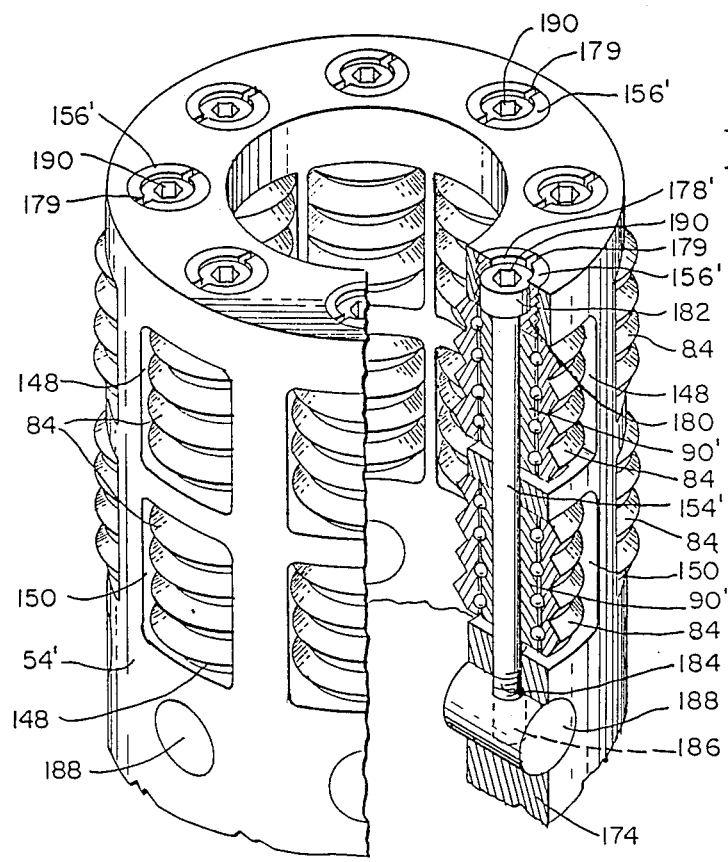
FIG. 6 is an isometric view of an enlarged windowed sleeve of the type used in the actuator of FIG. 5 and showing an alternative backlash elimination adjustment design.
Figure 5:
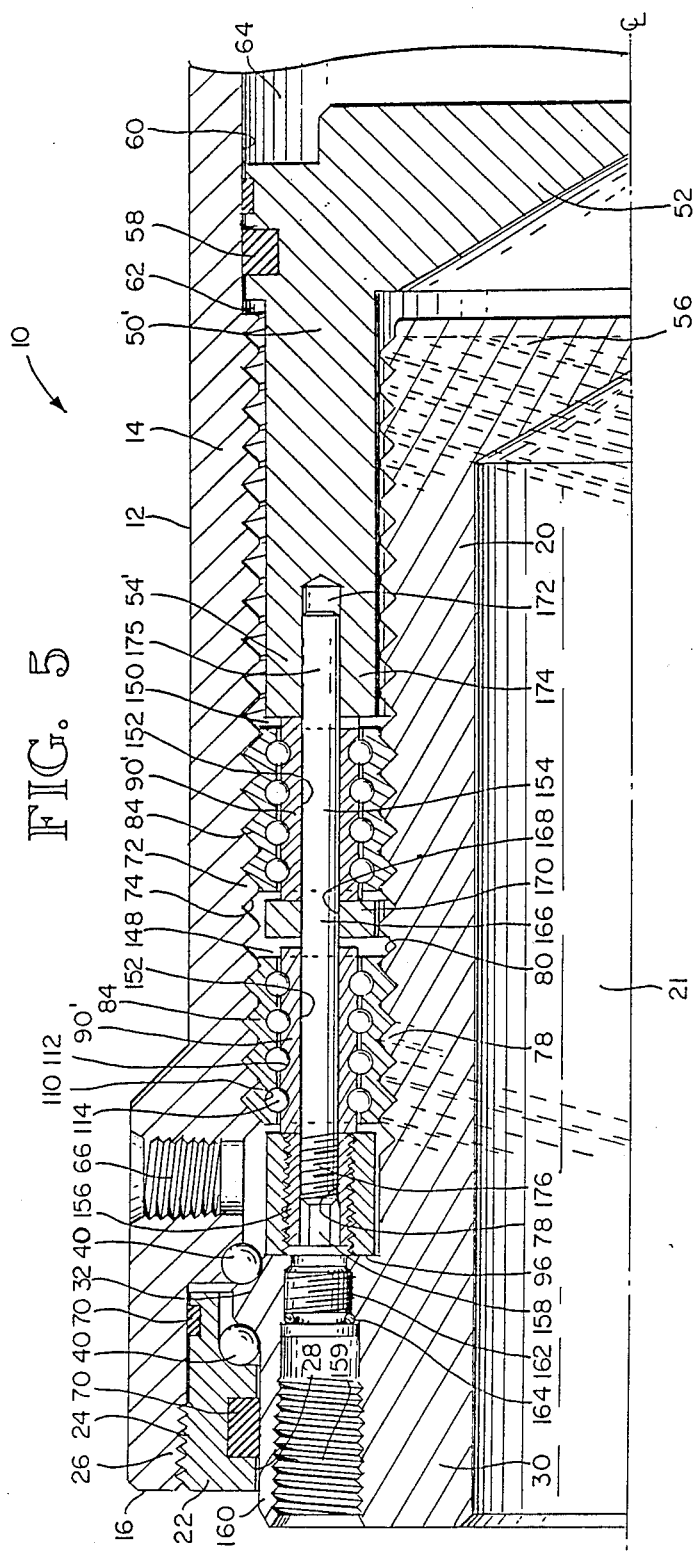
FIG. 5 is a partial fragmentary side elevational, sectional view of another alternative embodiment of the invention utilizing two roller sets for backlash elimination.

In the alternative embodiments of the invention shown in FIGS. 5 and 6, the sleeve portion 54' of the piston sleeve 50 has a first set of circumferentially spaced apart windows or sidewall openings 148 and a second set of circumferentially spaced apart windows or sidewall openings 150. The first set of sidewall openings 148 are axially spaced apart from the second set toward the first body end 16, inward from the outward end wall 96 of the sleeve portion 54'. The first and second sidewall openings 148 and 150 extend fully through the cylindrical sidewall of the sleeve portion 54', and are each sized to receive one of the rollers 84 therewithin. The sidewall of the sleeve portion 54' has a wall thickness sufficiently thin such that the rollers 84 extend radially inward and outward beyond the sidewall to seat in both the helical body and shaft grooves 74 and 80, and coact therewith for transmitting force between the body 12, the shaft 20 and the piston sleeve 50, in the manner described above for the embodiment of FIG. 1. By the use of two sets of rollers 84, the thrust handling capacity of the actuator is effectively doubled.

The rollers 84 are rotatably retained in the sidewall openings 148 and 150 in fixed axial and circumferential position relative to the piston sleeve 50 as the piston sleeve reciprocates within the body 12 during fluid powered operation of the actuator by a plurality of spindles 90'. One spindle 90' is disposed in each of the sidewall openings 148 and 150 in parallel axial alignment with the body 12 and has one of the rollers 84 coaxially and rotatably retained thereon and restrained against axial movement relative to the spindle. The rollers are retained on the spindles 90' in the manner previously described using a plurality of confronting and corresponding ball races 110 and 112 with a plurality of balls 114 seated in each of the ball channels formed by the ball races.

Each sidewall opening 148 of the first set of sidewall openings has a corresponding axially spaced apart sidewall opening 150 of the second set of sidewall openings, with the corresponding sidewall openings having the same circumferential position on the sleeve portion 54' to provide a plurality of pairs of corresponding axially spaced apart sidewall openings. Each of the spindles 90' disposed in the sidewall openings 148 and 150 has a longitudinally extending coaxial spindle bore 152 therethrough for slidably receiving an alignment pin 154. Each alignment pin 154 extends straight through both sidewall openings 148 and 150 of a corresponding pair of axially spaced apart sidewall openings, and through the spindle bore 152 of each of the spindles 90' disposed in the pair of sidewall openings. The alignment pins 154 are restrained by the sleeve portion 54' circumferential and radial movement relative to the sleeve portion, and restrain the spindles 90' against circumferential and radial movement within the sidewall openings 148 and 150.

The sidewall openings 150 of the second set of sidewall openings have an axial length substantially equal to the axial length of the spindles 90' disposed therein, with the axially outward end faces of the spindles engaging the axially inward end walls of the sidewall openings. As such, the rollers 84 retained on the spindles 90' in the sidewall openings 150 are restrained against axial movement in the sidewall openings. The rollers 84 have an axial length less than that of the spindles 90' and hence do not engage the end walls of the sidewall openings and remain free to rotate or the spindles. For backlash elimination purposes, the sidewall openings 148 of the first set of sidewall openings have an axial length sufficiently greater than the axial length of the spindles 90' disposed therein to allow adjustable axial movement of the spindles, and hence the rollers 84 mounted thereon, within at least a limited range.

The actuator 10 further includes a plurality of exteriorly threaded adjustment set screws 156, each threadably and adjustably received in an interiorly threaded set screw bore hole extending between the axially outward facing end wall 96 of the sleeve portion 4 and one of the sidewall opening 148 of the first set of sidewall openings. The set screw 156 projects into the corresponding first sidewall opening 148 and slidably engages an axially outward facing end wall of the spindle 90' disposed therein. The set screws 156 are selectively extendable to exert an adjustable axial force on the engaged spindles 90' to selectively and adjustably axially move the engaged spindle on its alignment pin 154, and thus the roller 84 retained by the spindle, by an amount within the limited range for spindle movement. This moves the roller of the engaged spindle relative to the roller retained by the spindle in the axially corresponding sidewall opening 150 of the second set of sidewall openings to reduce the slack between the two rollers and the helical body and shaft grooves 74 and 80 with which they coact and allows axial preloading. A set screw 156 is provided for each axially corresponding pair of sidewall openings.

Each of the set screws 156 is provided with an axially outward opening hexagonal aperture 158 for adjustably turning the set screw with a tool. In this embodiment of the invention, threaded recesses 159 in the shaft end portion 30 are used for attachment of the shaft 20 to an external load. The recesses 159 extend fully through a radially outward extending flange portion 160 of the shaft 20 positioned toward the first body end 16. The recesses 159 are also used to provide access to the set screws 156 within the body 12, and are positioned to correspond to the set screws 156 for their adjustment without disassembling the piston sleeve 50 from the body 12. Each of the recesses 159 is sealed against fluid leakage when not opened for making adjustments by a threaded plug 162 carrying an O-ring 164. The shaft flange portion 32 projects outward from the flange portion 160 and utilizes balls as the thrust bearings 40.

In the embodiment of FIG. 5, the alignment pins 154 each have a smooth shank portion 166 which is slidably disposed in a smooth bore 168 extending fully through a sidewall portion 170 of the sleeve portion 54' dividing the pairs of axially corresponding sidewall openings of the first and second sidewall openings 148 and 150. A smooth bore 172 extends from each of the second sidewall opening 150 into an adjacent sidewall portion 174 of the sleeve portion 54' to slidably receive a smooth end portion 175 of the alignment pin 154. The alignment pin 154 is further provided with a distal threaded end portion 176 threadably received in a longitudinally extending, threaded coaxial bore 178 in the corresponding set screw 156. As such, the alignment pin 154 travels with the set screw 156 as it is adjusted axially inward and outward for backlash elimination, with the smooth shank portion 166 and end portion 175 slidably moving in the smooth bores 168 and 172. Alternatively, the adjustment pin may be otherwise fixedly attached to the set screw or be formed as an integral part of the set screw.

The sleeve portion 5' is best shown in FIG. 6 with an alternative arrangement for the alignment pins and set screws. Although otherwise identical in structure and function, the set screws 156' in FIG. 6 have a slot 179 in the axially outward end face thereof for adjustably turning the set screw with a tool and a smooth axial bore 178' with an axially outward facing radial shoulder 180. The alignment pin 154' is slidably received in the set screw bore 178' and has a head 182 engaging the shoulder 180. A distal end portion 184 of the alignment pin 154' is threaded and threadably received in a threaded bore hole 186 formed in a plug 188 extending transversely through the sidewall portion 174 of the sleeve portion 54'. With this embodiment, after the set screw 156' is adjusted to eliminate backlash, the set screw can be locked in position by turning the alignment pin 154' with a tool using a hexagonal aperture 190 in the pin head 182 to apply an axially inward force on the set screw through engagement of hhe head with the set screw shoulder 180.

Figure 7:
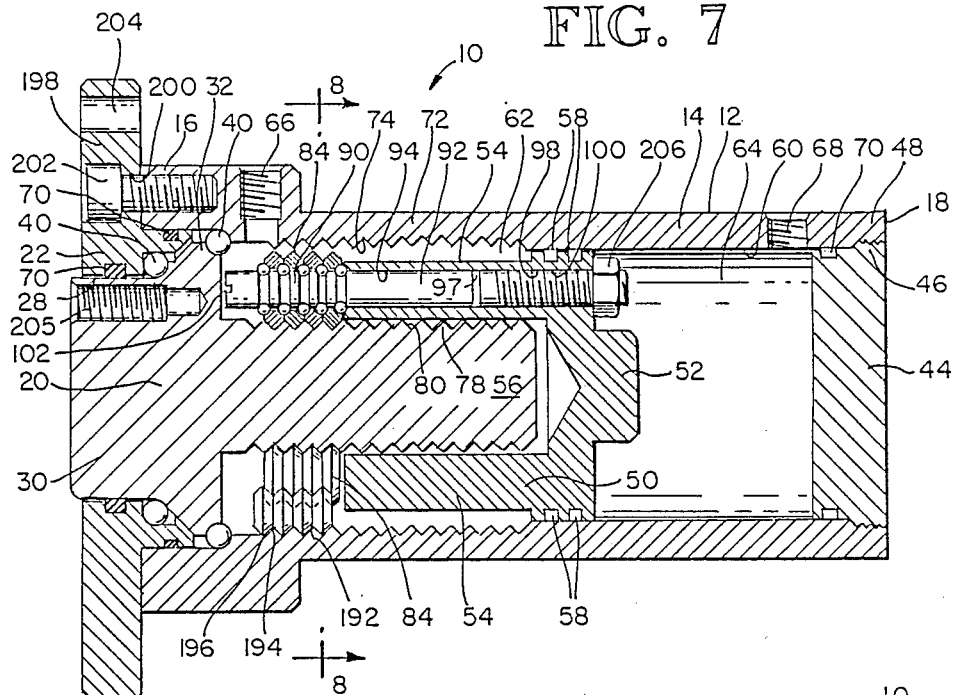
FIG. 7 is a side elevational, sectional view of yet another alternative embodiment of the invention utilizing engaged idler and main rollers.
Figure 8:
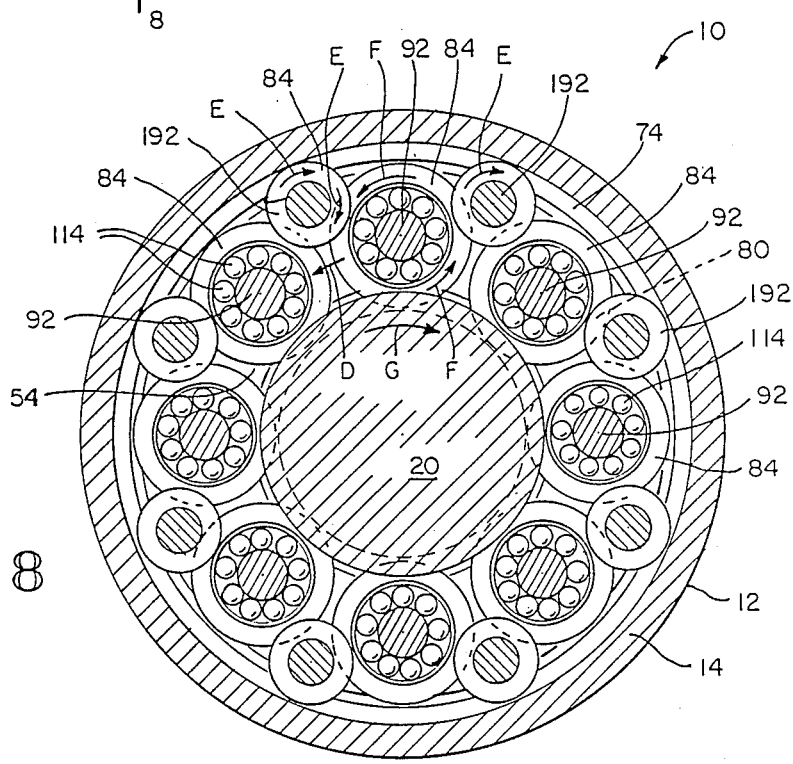
FIG. 8 is an enlarged sectional view taken substantially along the line of 8—8 of FIG. 7.

Another alternative embodiment of the invention is shown in FIGS. 7 and 8. This embodiment is similar to the the embodiment of FIG. 1, except that it is constructed to allow the use of body and shaft helical grooves 74 and 80 having the same hand to achieve the advantages of differential rotation but without the rollers 84 scuffing and slipping which would result if the same hand helical body and shaft grooves were used for the embodiment of FIG. 1. In this embodiment, the rollers 84 are retained by the spindles 92 in seated engagement with only the helical shaft grooves 80, and are positioned radially inward from the helical body grooves 74 and do not directly contact the body grooves.

The actuator 10, further includes a plurality of elongated idler rollers 192 having circumferential grooves and ridges therebetween with an axial pitch corresponding to the axial pitch of the helical body and shaft grooves and ridges 74, 76, 80 and 82, as do the rollers 84. The idler rollers 192 are distributed in circumferential arrangement between and nested in seated engagement with circumferentially adjacent pairs of the rollers B4 and the helical body grooves 74. The idler rollers 192 are in ti9ht contact with the helical body 9rooves 74 and two rollers 84, and the rollers 84 are each in tight contact with the helical shaft grooves 80 and two idler rollers. The arrangement of the rollers 84 and idler rollers 192 is best shown in FIG. 8. It is noted that the rollers 84 could be alternatively arranged in engagement with the body grooves, with the idler rollers 192 in engagement with the shaft grooves.

The idler rollers 192 transmit force between the body 12 and the adjacent pair of rollers 84 with which they engage, and each ridge of the idler rollers is positioned for rolling travel in the corresponding grooves of the helical body grooves 74. Although the idler rollers 192 are not rotatably retained on spindles 92 as are the rollers 84, the axial, radial and circumferential position of the idler rollers is in effect fixed relative to the piston sleeve portion 54 since the idler rollers and the rollers 84 have intermeshing circumferential grooves. As such, the idler rollers 192 are axially trapped by and must travel axially with the rollers 84 as the piston sleeve 50 reciprocates within the body 12. Moreover, since each of the idler rollers 192 is positioned generally at the center of a triangle defined by the helical body grooves 74 and the adjacent pair of rollers 84 it engages, the radial and circumferential position of the idler roller is fixed relative to the piston sleeve 50.

In the embodiment of FIG. 7, the first end cap 22 is not threaded for attachment to the body 12, as in FIG. 1, but rather has a radially outward extending flange 198 with a plurality of circumferentially spaced apart and recessed holes 200 for receiving bolts 202 for fastening the end cap to the first body end 16. The body 12 is attached to a support frame (not shown) by using a plurality of attachment holes 204 extending through the end cap flange 198. A plurality of threaded recesses 205 are provided in the shaft end portion 30 for attachment of the shaft 20 to an external device (not shown).

In this embodiment, the bore hole 94 extends fully through the sleeve portion 54 and the head portion 52. As before described, the spindle support arm portion 92 has its exteriorly threaded end portion 98 received in the interiorly threaded end portion 100 of the bore hole 94. The threaded end portion 98 of the support arm portion 92 projects out of the bore hole 94 and into the compartment 64. A lock nut 206 is threadably attached to the projecting support arm portion 92 for locking the spindle 90 against rotation during fluid powered operation of the actuator 10 after the axial position of the roller 84 carried thereon has been adjusted to eliminate backlash and axially preloaded.

Much as the operation described above for the embodiment of FIG. 1, linear reciprocation of the piston sleeve 50 produces rotation of the piston sleeve and the shaft 20 through the force-transmitting capability of the rollers 84 and the idler rollers 192. As the piston sleeve 50 reciprocates within the body 12 through application of fluid pressure to the fluid-tight compartment 62 and 64, torque is transmitted to the piston sleeve 54 through the coaction of the rollers 84 with the idler rollers 192, and through the coaction of the idler rollers with the helical body grooves 74. The axial force created by fluid pressure on the head portion 52 causes the idler rollers 192 to roll along the helical body grooves 74 and transmit torque through the rollers 84 to the piston sleeve 50. The transmitted torque causes the piston sleeve 50 to rotate as it moves axially.

By way of example, if the helical body grooves 74 are left hand, the piston sleeve, rotates counterclockwise, when viewed from the first body end 16, as the piston sleeve 50 moves from the first body end 16 to the second body end 18 when pressure is applied to the compartment 62 through the port 66, as shown by arrow "D" in FIG. 8. As the piston sleeve 50 rotates counterclockwise, the idler rollers 192 roll along the helical body grooves 74 and themselves rotate clockwise, as shown by arrow "E." The rotation of the idler rollers 192 in the clockwise direction imparts a counterclockwise rotation to the rollers 84, as shown by arrow "F."

The resulting linear and rotational movement of the piston sleeve 50 transmits both axial and rotational force to the shaft 20 through the coaction of the rollers 84 with the helical shaft grooves 80. The transmitted force causes the shaft 20 to rotate relative to the body 12 since axial movement of the shaft is restricted by the thrust bearings 40. As such, axial movement of the piston sleeve 50 produced by fluid pressures is converted into relative rotational movement between the body 12 and the shaft 20.

Continuing the example discussed above, if the helical shaft grooves 80 are also left hand to achieve the benefits of differential rotation, the axial movement of the piston sleeve 50 toward the second body end 18 causes the shaft 20 to rotate clockwise relative to the piston sleeve, as shown by arrow "G" in FIG. 8. As the shaft 20 rotates clockwise, the rollers 84 roll along the helical shaft grooves 80 which tends to rotate them counterclockwise. Since this is the same rotational direction for the rollers 84 as caused by the idler rollers 192 rolling along the helical body grooves 74, as described above, no scuffing or slippage of the rollers 84 or the idler rollers 192 occurs. Thus the benefit of rolling friction rather than sliding friction is realized even with the same hand for the helical body and shaft grooves 74 and 80.

Since as described above the piston sleeve 50 rotates counterclockwise and the shaft 20 rotates clockwise in response to the application of fluid pressure to the compartment 62, the resulting relative rotation between the body 12 and the shaft is the difference of the rotation of the piston sleeve relative to the body and the rotation of the shaft relative to the piston sleeve. The differential rotation allows the design of a rotary actuator with less rotary output, but with a longer stroke and thus an increased output torque. This is particularly advantageous when air is used as the fluid to power the actuator since air requires large piston displacements, such as is possible using the long piston stroke produced with differential rotation. It is noted that by use of the idler rollers 192 to transmit force between the rollers 84 and the helical body grooves 74, the rotational direction of the rollers 84 is reversed from what it would be if they were directly contacting the helical body grooves as is the situation with the embodiment of FIG. 1. This results in the rollers 84 and the shaft 20 having compatible rotational directions which produces no scuffing or slippage therebetween as the rollers 84 roll along the helical shaft grooves 80.

Of course, the rotational directions described above are merely reversed when the piston sleeve 50 moves from the second body end 18 to the first body end 16 when fluid pressure is applied to the compartment 64 through the port 68.

In an alternative embodiment shown in FIG. 11, similar to the embodiment of FIGS. 7 and 8, the idler rollers 192 are also retained on spindles identical to those of the roller 84, with the spindles for the rollers 84 indicated by the reference numeral 92a and the spindles for the idler rollers indicated by the reference numeral 92b. The piston sleeve portion 54 has a wall thickness sufficiently thick to accommodate the bore holes 94 for the roller spindles 92a as well as the bore holes for the idler roller spindles 92b which are radially offset outward of the roller spindles 92a in a radially staggered manner. In this embodiment, as in the embodiment of FIG. 7 and 8, every other roller is an idler roller 192 and the idler rollers are nested in seated engagement with circumferentially adjacent pairs of the rollers 84 and the helical body grooves 74. However, the idler rollers 192 do not rely upon being trapped in this nested arrangement to maintain their axial, radial and circumferential position fixed relative to the piston sleeve portion 54. Since the idler rollers 192 and the rollers 84 mesh, they must have the same or, at least, substantially the same axial pitch.

In an alternative embodiment shown in FIG. 12 idler rollers 192 retained on spindles 92b are used as in the embodiment of FIG. 11; however, unlike the embodiments of FIGS. 7 and 11, the idle rollers are spaced apart from and do not nest with the rollers 84. Instead, the idler rollers 192 are in seated engagement with only the helical body grooves 74 and the rollers 84 are in seated engagement with only the helical shaft grooves 80. With this arrangement, the helical body and shaft grooves 74 and 80 may have the same hand to utilize differential rotation or have the opposite hand without realizing roller scuffing or slipping since the rollers 84 and the idler rollers 192 engage only one or the other of the helical body or shaft grooves 74 or 80, and do not mesh with the rollers of the other set. For the same reason the helical body and shaft grooves 74 and 80 may have different pitches. It is noted, however, that forces on the rollers 84 and the idler rollers 192 are not balanced, and since the rollers do not mesh together and support each other, substantial bending stresses can be created in the spindles 92rretaining the rollers. As such, this design of actuator is used for lower loads.

In the embodiments of the actuator shown in FIGS. 7, 11 and 12 the rollers 84 have an alternative roller design. As best shown in FIGS. 9 and 10, the alternative roller design includes four annular roller disks 208 indicated by the reference letters a, b, c and d disposed on the spindle 90 in juxtaposition and operating together to form the roller 84.

Each of the roller disks 208 has a coaxial opening 210 therethrough sized to slide axially on the spindle 90 during assembly and for free rotation of the disk about the spindle during powered operation. Each of the roller disks has first and second axially outward and oppositely facing first and second sidewalls 212 and 214, respectively. The sidewalls 212 and 214 each have an axially outward opening circumferential ball groove 216 formed thereon extending about the central opening 210 of the roller disk 208.

The first and second sidewalls 212 and 214 of each roller disk 208 and the ball grooves 216 formed thereon are axially spaced apart to correspond with the axial positioning of the ball grooves 112 formed on the spindle 90. The roller disks 208 are disposed on the spindle 90 with the second sidewall 214 of one disk in juxtaposition with the first sidewall 212 of the next adjacent disk. As such, the ball groove 216 in the second sidewall 214 of one disk and the ball groove of the first sidewall 212 of the next adjacent disk form the roller ball race 110 which with the corresponding ball race 112 of the spindle 90 forms one of the ball channels containing the roller balls 114. As shown in FIG. 9, the four roller disks 208 a, b, c and d comprising one roller 84 coact with five spindle ball races 112, indicated by the reference letters a, b, c, d and e.

The roller disk ball grooves 216 are cut to form substantially one quarter of the circumferential wall of a ball channel, and as such, each sufficiently overlays the corresponding spindle ball race 112 to retain without assistance the balls 114 in the corresponding spindle ball race. To allow for loading of the balls 114 into the ball race 112 once the roller disk 208 is in position on the spindle 90, a ba)1 loading opening 218 is provided in the second sidewall 214 of the roller disk. The loading opening 218 connects with the ball groove 216 formed in the roller disk second sidewall 214, and extends radially away from the spindle 90 by an amount sufficient to receive and pass balls into the spindle ball race 112 with the roller disk 208 in operative position on the spindle, that is, with the ball groove 216 in its roller disk first sidewall 212 in engagement with the balls 114 disposed in the corresponding spindle ball race 112.

The roller 84 comprised of the roller disks 208 is assembled on the spindle 90 by first loading a set of ball 114 in the axially outermost spindle ball race 112a toward the first body end 16. The first roller disk 208a is then slid along the spindle 90 from its threaded end portion 98 to bring the ball groove 216 in the first sidewall 212 of the roller disk into seated engagement with the balls. This results with the loading opening 218 of the first roller disk 208a facing axially inward toward the second body end 18. Next, another set of the balls 114 is loaded through the loading opening 218 in the second sidewall 214 of the roller disc 208a, to fill the corresponding spindle ball race 112b. As just described for the roller disk 208a, the next roller disc 208b is then slid into position with the ball groove 216 in its first sidewall 212 in seated engagement with the balls in the spindle ball race 112b. This assembly procedure is continued until the spindle ball race 112e is loaded with a set of the balls. It is noted that the spindles 90 used in the embodiment of at least FIG. 7 do not have the flange 104 shown with the spindles of FIG. 1.

The first sidewall 212 of each of the roller disks 208 has a radial circumferential flat sidewall portion 220 which is radially positioned to block the ball loading opening 218 in the next adjacent roller disk and prevent balls from exiting therethrough during fluidpowered operation of the actuator. Since the endmost roller disk 208d toward the second body end 18 is the last loaded with balls 114 and has no next adjacent roller disk to block its loading opening and maintain the balls loaded in the spindle ball race 112e, the axially outward end wall 96 of the sleeve portion 54 has an inwardly beveled end wall portion 222. In effect, the beveled wall portion 222 forms the missing quarter section of the ball channel with the ball race 216 in the second sidewall portion 214 of the roller disk 208d and with the spindle roller race 112e, and also serves to block the ball loading opening 218 in the roller disk 208d.

Each of the roller disks 208 has a radially outward facing surface portion 224 shaped to form in combination with the outward facing surface portions of the other roller disks comprising the roller 84, the desired grooves 86 and ridges 88 contour of the roller. While functionally the equivalent of the rollers 84 shown in FIG. 3, the rollers of FIG. 9 eliminates the need for the filler holes 116 and sealer plugs 118.

In FIG. 13 another actuator 10 is shown with rollers 84 using four roller disks 208a–d. In this embodiment the spindles 92 employ the flange 104 for seating against the sleeve portion end wall 96, thus preventing the roller disks from sliding onto the spindles from the spindle threaded end portion 98. As such, the orientation of the roller disks 208 on the spindles 92 is reversed with the ball loading openings 218 facing axially outward toward the first body end 16. A retainer ring 226 is mounted on each spindle 90 axially outward of the first roller disk 208a, and has an axially inward opening circumferential ball groove 228 formed thereon which corresponds to the ball groove 216 of the first roller disk. The retainer ring 226 projects radially outward sufficient to block the ball loading opening 218 in the first roller disk 208a. A split ring 230 is seated in a circumferential groove on the spindle 90, axially outward of the retainer ring 226, to hold the retainer ring in place.

The actuator 10 of FIG. 13 has a spindle adjustment arrangement to eliminate backlash similar to that of the embodiment of FIG. 7, except a lock plate 232 is positioned in the compartment 64 adjacent to the piston head portion 52. The lock plate 232 has a circumferentially extending flange 234 with smooth bore holes 236 corresponding in position to the threaded bore holes 94 in the piston sleeve 50. The spindle support arm portion 92 has its exteriorly threaded end portion 98 received in the interiorly threaded end portion 100 of the bore hole 94 projecting out of the bore hole through the corresponding hole 236 in the lock plate 232 and into the compartment 64. The lock nut 206 is threadably attached to the projecting support arm end portion 98. In this embodiment the slot 102 is cut in the axial end face of the threaded end portion 98 on which the nut 206 is attached.

Once the axial positions of the rollers 84 carried on the spindles 90 have been adjusted to eliminate backlash and for axially preloading by turning the spindles using the slots 102, the lock nuts 206 are snuggly tightened against the lock plate flange 234. The lock nuts are not tightened so much, however, as to cause the spindles to rotate, as can inadvertently happen with the spindle locking arrangement of FIG. 7 causing inaccurate backlash settings of the spindles. Once all of the lock nuts 206 are snug to the lock plate flange 234, the actual locking of the spindles against rotation during fluid-powered operation of the actuator 10 is achieved by turning a plurality of circumferentially positioned locking set screws 238 threadably received in threaded bore holes 240 in the lock plate 232. The set screws 238 are turned inward until they engage the piston head portion 152 and apply an axial outward force on the locking plate 232 toward the second body end 18 and transmit this force as an axially outward locking force on the spindles 90. In such manner, an axial locking force can be applied to the spindles 90 without also applying torque to the spindle support arm portions 92 or the lock nuts 206 which could inadvertently cause rotaton of the spindles 90 and change their backlash setting.

Various alternative embodiments of the piston sleeve 50, the spindle 90, the rollers 84 and backlash elimination described and shown in the drawings may be utilized in different combinations within the spirit and scope of the present invention. For example, the idler rollers 192 shown in FIG. 7 may be utilized with a piston sleeve 50 of the type shown in FIGS. 5 and 6. Moreover, the elongated piston sleeve arrangement shown in FIG. 4 may be used with any embodiment.

Figure 14:
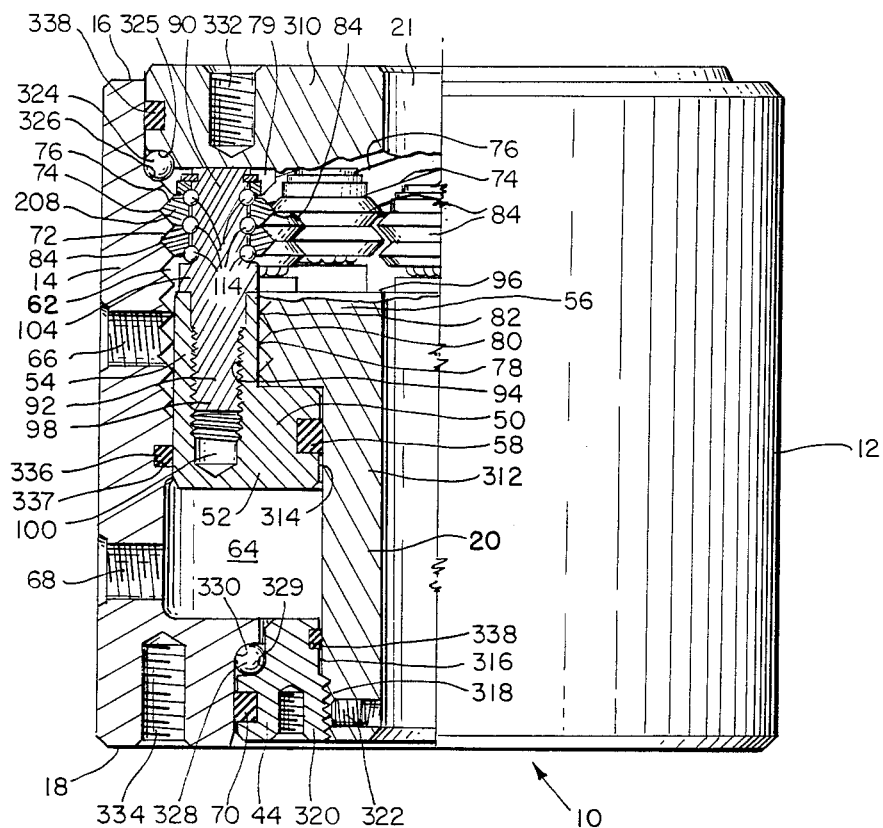
FIG. 14 is a side elevational, partial sectional view of still another embodiment of the invention utilizing axially offset rollers.

Yet another embodiment of the invention very similar to the embodiments of FIGS. 1 and 13 is shown in FIG. 14. In this embodiment the actuator 10 does not utilize a first end cap, but rather the shaft 20 is provided with a flanged portion 310 positioned at the first body end 16. The shaft 20 has a coaxial elongated portion 312 which extends from the shaft end portion 56 (which has cut therein the helical shaft grooves 80) to the second body end 18. The elongated shaft portion 312 projects through a smooth central aperture 314 in the head portion 52 of the piston sleeve 50 to within a threaded central aperture 316 formed in the second end cap 44. The extending shaft portion 312 has a threaded outer oortion 318 threadably received within a threaded portion 320 of the central aperture 316 to fixedly attach the second end cap to the shaft for rotation therewith. A locking set screw 322 is provided to lock the end cap 44 in place on the extending shaft portion 312 during fluid powered operation of the actuator.

The shaft 20 is rotatably held in place against axial thrust by thrust bearings 324 disposed between a circumferential ball race 325 formed in the shaft flanged portion 310 and a circumferential ball race 326 formed in the body sidewall 14 toward the first body end 16, and by thrust bearings 328 disposed between a circumferential ball race 329 formed in the second end cap 44 and a circumferential ball race 330 formed in the body 12 toward the second body end 18.

In this embodiment, the shaft flanged portion 310 is provided with a plurality of threaded recesses 332 for attachment of the shaft 20 to an external device (not shown). Similarly, the body 12 is proided with a plurality of threaded recesses 334 at the second body end 318 for attachment of the body to a stationary support frame (not shown). It is noted that in the embodiment of FIG. 14, the piston head portion 52 does not carry an outer seal, but rather a seal 336 is positioned stationary within a groove 337 in the body sidewall 14. Conventional seals 338 are disposed between the second end cap 44 and the extending shaft portion 312, and between the shaft flanged portion 310 and the body sidewall 14 toward the first body end to prevent fluid leakage.

In the embodiment of FIG. 14, the rollers 84 are each comprised of two annular roller disks 208 dispose on spindles 90 of the type shown in FIG. 13. Of particular significance with the embodiment of FIG. 14 is the use of rollers 84 with every other one of the circumferentially distributed rollers being axially offset from the next adjacent roller by preferably one-half the axial pitch of the helical shaft grooves 80. The rollers are still maintained in a balanced arrangement with equal inter-roller spacing. This is to be compared with the rollers in the previously described embodiments which are axially positioned in generally coplanar relation to each other with the ridges 88 of one roller 84 being axially positioned generally co-planar with the corresponding ridges of the adjacent roller.

The alternating axial off-setting of the rollers 84 is accomplished in the embodiment of FIG. 14 by providing the flange 104 of the support arm portion 92 of every other one of the spindles 90 with a thickness in the axial direction greater than the thickness of the flange for the two adjacent spindles by an amount equal to one-half the axial pitch of the helical shaft grooves 80. In such manner, the rollers 84 are rotatably retained in fixed axial and circumferential position relative to the piston sleeve 50 with every other one of the rollers 84 being axially offset toward the first body end 16 by one-half the pitch of the shaft grooves. This permits the rollers to be circumferentially positioned closer together to substantially nest the ridges of one within the grooves of the other, although the rollers are held out of engagement with each other.

Figure 15:
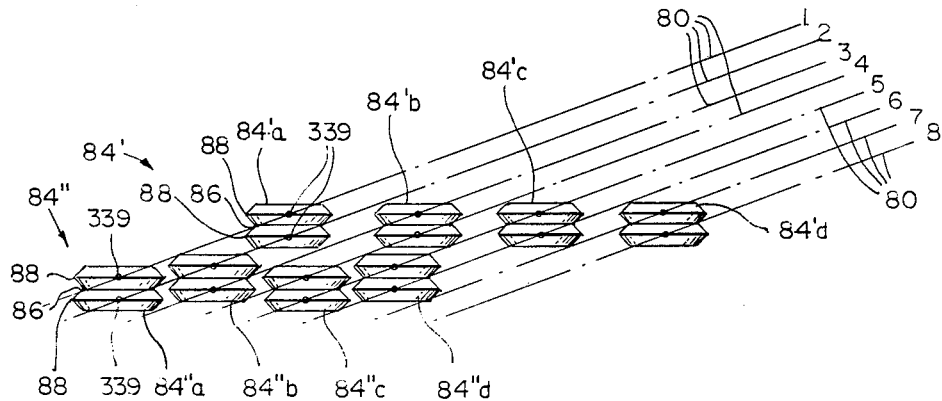
FIG. 15 is a schematic diagram of four of the axially offset rollers of FIG. 14 with the shaft grooves shown inpplanar representation.

The axially offset positioning of the rollers is shown in the schematic diagram of FIG. 15 compared to an alternative coplanar axially aligned arrangement of rollers, with the coplanar rollers indicated by reference numeral 84' and the axially offset rollers indicated by reference numeral 84". For purposes of illustration, a set of four circumferentially adjacent coplanar rollers 84' and a set of four circumferentially adjacent axially offset rollers 84" are shown and indicated with reference letters a, b, c and d. The helical shaft grooves 80 of the shaft 20 are shown with a planar representation for purposes of illustration, with the adjacent grooves being numbered 1 through 8. For clarity, the ridges 82 positioned between adjacent shaft grooves 80 are not shown.

As previously described, the rollers 84' and 84" are provided with circumferential grooves 86 and ridges 88 having substantially the same axial pitch as the helical body and shaft grooves 74 and 80. The circumferential ridges 88 of each of the rollers 84' and 84" are in seated engagement with the corresponding helical body and shaft grooves 74 and 80 (for convenience, the point where the shaft groove bottom engages the roller ridge is shown by a dot, indicated by reference numeral 339 for the two discs 208 comprising the rollers 84'a and 84"a). As the actuator 10 operates, the piston sleeve 50 reciprocates within the body and the two ridges of each of the rollers 84' and 84" roll back and forth in its corresponding helical body and shaft grooves 74 and 80.

The coplanar arrangement for the rollers 84' is shown in FIG. 15 and, as described for the previous embodiments, requires the number of helical shaft grooves 80 be equal to the number of rollers or be an integer multiple thereof, assuming that the rollers are circumferentially distributed with equal inter-roller spacing. For the size of the rollers 84' and helical shaft grooves 80 shown in FIG. 15, this requires that the number of helical shaft grooves be two times the number of rollers utilized. it is noted that if smaller diameter rollers were used, then the number of shaft grooves could be made equal to the number of rollers. Thus, for example, for a situation requiring 16 rollers 84', the shaft must have 16, 32 or 48 grooves, etc. FIG. 15 illustrates a situation using 16 rollers 84' with 32 grooves, and displays four of the rollers 84' in eight grooves of the 32 grooves. It can be seen that the corresponding ridges of adjacent rollers 84' are disposed in every other shaft groove 80. The number of body grooves 74 are determined as previously described for other embodiments.

In comparison, utilizing 16 axially offset rollers 84" requires the shaft to have 24 grooves, rather than 16 or 32 as for rollers 84', or in other words for the same size rollers and grooves, the number of grooves 80 on the shaft may be equal to 1.5 times the number of rollers. This can be accomplished while still maintaining equal inter-roller spacing. In practice, this means that once the number of rollers is selected for the actuator to handle the loads involved, rather than requiring that the helical shaft grooves be equal to the number of rollers used or an integer multiple thereof (assuming equal roller inter-spacing), such as twice the number of rollers used, the number of shaft grooves used can be selected as 1.5 times the number of rollers.

In this embodiment, unlike with the previously described embodiments, the number of body grooves 74 are selected to be equal to the number of shaft grooves 80, in other words, to be equal to 1.5 times the number of rollers. Since the body and shaft grooves 74 and 80 have equal axial pitch and the same number of grooves (i.e., groove starts), and since the grooved inward body surface portion 72 has a larger pitch diameter than the grooved outward shaft surface portion 78, the shaft grooves 80 must have a greater lead angle (i.e., helix angle) than the body grooves 74.

The use of axially offset rollers and a number of grooves 1.5 times the number of rollers, rather than 1 or 2 times the number of rollers as with coplanar rollers, provides added flexibility in designing the actuator. With the actuators presently being designed using the invention, it provides the ability to select, for example, in a 16 roller actuator a design using not only 16 or 32 grooves, but also a design using 24 grooves if axially offset rollers are used. This can be extremely important since it allows more selection in the groove (thread) size for the helical body and shaft grooves 74 and 80, so that a groove size can be selected which is not too fine nor too coarse.

If too many grooves are used, the grooves will be too fine and have a small axial pitch. This means that rollers with correspondingly small axial pitch will be needed, however, the smaller the pitch, the thinner the disks 208 which comprise the rollers 84. With axially thin disks, the rollers have decreased 1 oad carrying capability and thus, the overall load ratin9 of the actuator is decreased.

If too few grooves are used, the grooves will be too coarse and have a large axial pitch. Although the individual roller disks will not have to be made thinner, and in fact may even be made thicker, to use rollers of about the same axial length so as not to increase the length of the actuator, the number of disks utilized for each roller will have to be decreased. With fewer roller disks used, there is less load bearing contact between the rollers and the shaft and body, and hence the load carrying capability of the rollers is decreased, as is the overall load rating of the actuator. While rollers may be used having the same number of disks to maintain the same amount of roller/groove load bearing contact, they will have to be made longer to be compatible with the larger axial pitch of the grooves. This will undesirably lengthen the overall size of the actuator. Lengthening of the rollers is, however, also undesirable because the rollers are supported in cantilevered fashion on the spindles and lengthening of the rollers increases the torque applied to the spindles. This can result in spindle failure.

As such, the added flexibility in selecting the number of grooves for the shaft and body is of great assistance in the design of an actuator and allows a design with improved load carrying ability without increasing the roller and actuator length. Another benefit of axially offsetting the rollers and the flexibility provided in selection of the number of grooves used is that the resulting actuator has greater piston travel and displacement, which results in more output torque being produced.

Figure 16:
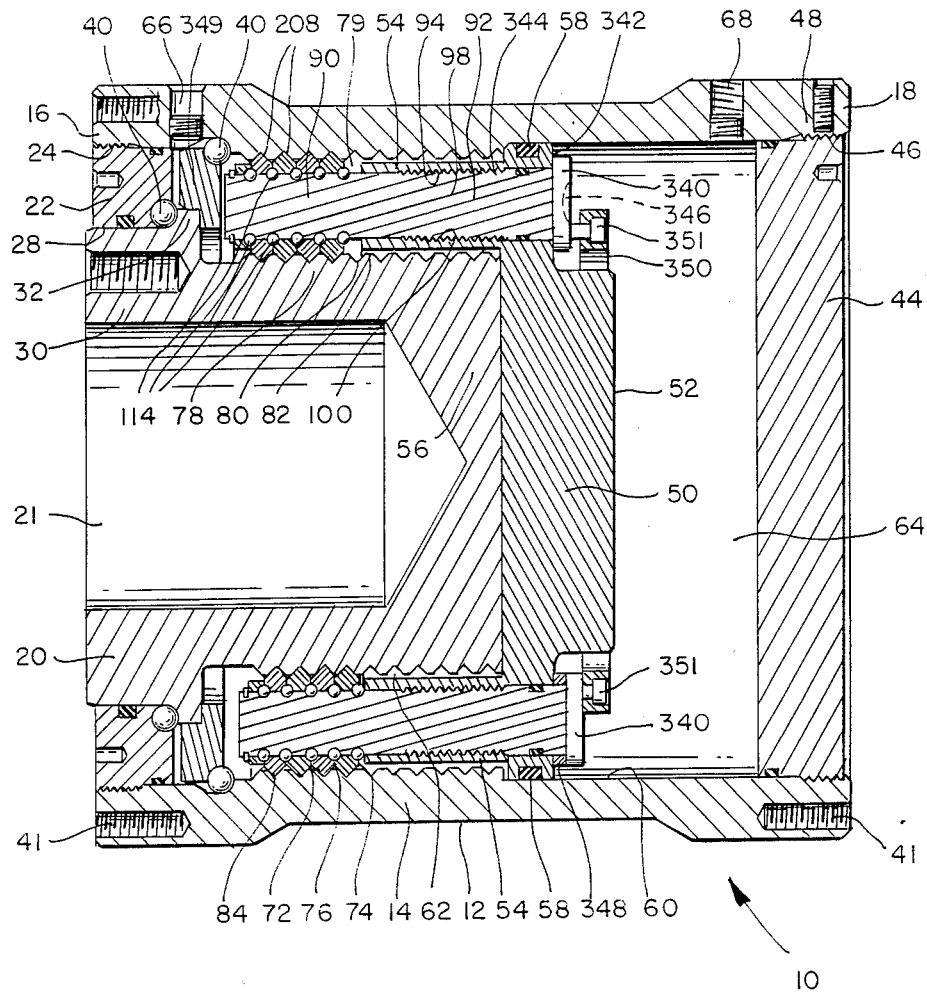
FIG. 16 is another alternative embodiment of the invention utilizing axiallyoffset rollers.

Another alternative embodiment of the invention utilizing the offset rollers is shown in FIG. 16 using rollers 84 with four roller disks 208. A thrust bearing ring 349 is positioned inward of the first end cap 22 and engages the shaft flange portion 32 to restrain the shaft 20 against axial thrust. In this embodiment, the bore holes 94 in the sleeve portion 54 f the piston sleeve 50 into which the spindle support arm portions 92 are received extend fully through the piston head portion 52. In addition, in this embodiment the spindle support arm portions 92 each include a head portion 340 which is adjustably movable into engagement with an axially outward end wall 342 of the piston head portion 52 facing toward the second body end 18. The support arm portion 92 has a threaded mid-portion 344 threadably received in the interior threaded end portion 100 of the bore hole 94. A slot 346 is formed in the head 340 of each spindle support arm portion to allow selective turning of the spindle with a tool.

To provide for axial off-setting of adjacent spindles 90, every other one of the spindles has an annular spacing shim 348 with a thickness equal to approximately one-half the pitch of the shaft helical grooves 80. The spindle support arm portion 92 extends through the central aperture of the shim 348, and the shim is disposed between the support arm head portion 340 and the end wall 342 of the piston head portion 52. In this embodiment, the spindle support arm portions 92 are first threadably inserted into the bore holes 94, and then the roller disks 208 and balls 114 that make up each of the rollers 84 are assembled on the spindle 90 which protrudes beyond the sleeve portion 54 of the piston sleeve 50 toward the first body end 16.

Once the spindles 90 with assembled rollers 84 are in place, backlash can be eliminated by unscrewing toward the second body end 18 the circumferentially alternate spindle support arm portions 92 with the shims 348. The support arm portions 92 are unscrewed until sufficient axial movement of every other of the support arm portions (and hence the spindles 90 and the rollers 84 retained thereon), is achieved relative to the other support arm portions (and the spindles and rollers retained thereon) to eliminate the slack between the rollers and the helical body or shaft grooves, as previously described for other embodiments.

The support arm portions without shims are not unscrewed for backlash elimination, and may be seated firmly in the threaded bore holes 94 to lock them in place so that they tend not to work loose. The support arm portions with shims, however, have already been at least very slightly loosened for backlash elimination purposes and should be locked in place to prevent their turning and the resulting axial movement thereof during actuator operation. To accomplish this without applying torque to the support arm portions which could cause them to rotate and disturb the backlash elimination setting, a lock ring 350 is bolted to the piston head portion 50 to a side toward the second body end 18 by a plurality of bolts 351. The lock ring 350 engages the head portions 340 of the spindle support arm portions 92 with the shims 348 which have been turned in order to eliminate backlash. This clamps these support arm portions against any further axial movement produced by rotary forces applied to the spindles during fluid powered operation of the actuator and prevents the threaded spindle support arm portions from being backed out of the threaded bore holes 94 within which they are received. Since the head portions of support arm portions 92 with shims are positioned axially outward of the other support arm portions without shims, the lock ring does not engage the head portions of these other support arm portions.

It is noted that while axially offset rollers have been described only for the actuator embodiments of FIGS. 14–16, the same benefits can be realized for the other previously described embodiments.

It will be appreciated that, although specific embodiments of the invention have been described herein for purposes of illustration, various modifications may be made without departing from the spirit and scope of the invention. Accordingly, the invention is not limited except as by the appended claims.

I claim:
1. A fluid-power device, comprising:
   a body having a plurality of helical grooves with ridges therebetween formed on an inward facing surface portion thereof;
   an axially extending drive member supported for movement relative to said body and connectable to an external device, said drive member having a plurality of helical grooves with ridges therebetween formed on an outward facing surface portion thereof positioned within said body;

a plurality of elongated rollers, each having at least one circumferential ridge;

an axially reciprocating member reciprocally mounted within said body, said reciprocating member rotatably retaining said rollers in fixed axial and circumferential position relative to said reciprocating member during powered operation of the fluid-power device, said rollers being retained by said reciprocating member in circumferentially distributed arrangement between said grooved body inward surface portion and said grooved drive member outward surface portion with each of a first plurality of said rollers and a second plurality of said rollers in seated engagement with both said grooved body inward surface portion and said grooved drive member outward surface portion for transmitting force between said body, drive member and reciprocating member, said ridge of each of said rollers being positioned for rolling travel in the corresponding grooves of said body and said drive member, said first plurality of rollers and said second plurality of rollers being alternately distributed about the circumference of said reciprocating member, one of said first or second pluralities of rollers being axially offset in one axial direction relative to the other of said first or second plurality of rollers so as to position said ridge of each said roller in different ones of said helical body and drive grooves than said helical body and drive grooves in which the corresponding ridges of the two immediately adjacent rollers are positioned; and at least one piston mounted for reciprocal movement and operatively engaging said reciprocating member.

2. The device of claim 1 wherein said body helical grooves have a first load and said drive member helical grooves have a second lead, with said drive member helical grooves having a hand turn opposite the hand turn of said body helical grooves and having substantially the same axial pitch as said body helical grooves, and wherein said rollers each have a plurality of said roller ridges having an axial pitch corresponding to the axial pitch of said body and drive member helical grooves.

3. The device of claim 1 wherein said first and second pluralities of rollers are in fixed radial position relative to said reciprocating member.

4. The device of claim 3 wherein said rollers of said first and second pluralities of rollers are spaced apart and out of engagement with each other.

5. The device of claim 1 wherein the lead of said drive member helical grooves are selected substantially according to the relationship:

groove lead = groove axial pitch × number of grooves.

6. The device of claim 1 wherein said reciprocating member includes a plurality of spindles each with an attached end portion connected to said reciprocating member and a free end portion positioned in a circumferential space between said grooved body and drive member surface portions, said spindle free end portions being in circumferentailly distributed arrangement within said space about said drive member, said spindles each having at least one of said rollers coaxially and rotatably retained on said free end portion thereof, said free end portions providing a cantilevered support for said rollers and retaining said rollers against axial movement relative to said free end portions, said spindles being retained by said reciprocating member to prevent axial movement of said spindles relative to said reciprocating member during powered operation of the fluid-power device.

7. The device of claim 6 wherein said rollers retained on said spindles each having a longitudinally extending substantially coaxial roller bore therethrough rotatably receiving one of said spindles, said axial bore being defined by an interior sidewall, corresponding ones of said roller bore sidewalls and spindles having integrally formed thereon a plurality of confronting and corresponding ball races defining a plurality of ball channels extending circumferentially thereabout, and the device further includes a plurality of balls seated in said ball channels to restrict axial movement of said rollers relative to said spindles while permitting free rotation of said rollers on said spindles.

8. The device of claim 7 wherein said rollers retained on said spindles each is defined by a plurality of rings disposed on one side of said spindles, each of said rings having a radially outward facing surface portion shaped to form in combination with the other of said plurality of rings a plurality of said roller ridges with a circumferential groove between adjacent ridges.

9. The device of claim 6 wherein each of said spindle attached end portion is supported by a coaxially extending support arm and said reciprocating member includes a sleeve portion having a plurality of circumferentially spaced apart bore holes therein, said spindle support arms being disposed in said sleeve bore holes.

10. The device of claim 9 wherein at lest one or more of said spindle support arms are selectively and adjustably axially movable in said sleeve bore holes, and the device further includes means for selectively and adjustably axially moving said movable spindle support arms in an axial direction relative to the others of said spindle support arms within at least a limited range to axially move said rollers rotatably retained on said movable spindles relative to said rollers rotatably retained on the other of said spindles and thereby eliminate backlash resulting from said rollers coacting with said body and drive member helical grooves as said piston moves from one axial direction to the other within said body as it reciprocates.

11. The device of claim 10 wherein said movable spindle support arms and said sleeve portion bore holes are correspondingly threaded, and said movable spindle support arms are adjustably axially moved by rotation thereof, and the device further includes lock means for locking said movable spindle support arms against rotation during powered operation of the fluid-power device.

12. The device of claim 11 wherein said sleeve portion bore holes extend fully therethrough and said movable spindle support arms have an end portion projecting out of said bore holes, and wherein said lock means includes a locking member attached to said reciprocating member and applying an adjustable axial locking force on said support arm extending end portions of said movable spindle support arms to lock said support arms against rotation during powered operation of the fluid-power device without applying a rotary force thereto.

13. The device of claim 10 wherein at least one or more of said spindle support arms are axially fixedly retained within their corresponding sleeve bore holes, with said movable support arms and said fixed support arms being circumferentially alternately positioned.

14. A fluid-power device, comprising:
a body having a plurality of helical grooves with ridges therebetween formed on an inward facing surface portion thereof;
an axially extending drive member supported for movement relative to said body and connectable to an external device, said drive member having a plurality of helical grooves with ridges therebetween formed on an outward facing surface portion thereof positioned within said body;
a plurality of elongated rollers, each having at least one circumferential ridge;
an axially reciprocating member reciprocally mounted within said body, said reciprocating member rotatably retaining said rollers in fixed axial and circumferential position relative to said reciprocating member during powered operation of the fluid-power device, said rollers being retained by said reciprocating member in circumferentially distributed arrangement between said grooved body inward surface portion and said grooved drive member outward portion with each of a first plurality of said rollers and a second plurality of said rollers in seated engagement with both said grooved body inward surface portion and said grooved drive member outward surface portion for transmitting force between said body, drive member and reciprocating member, said ridge of each of said rollers being positioned for rolling travel in the corresponding grooves of said body and said drive member, said first plurality of rollers and said second plurality of rollers being alternately distributed about the circumference of said reciprocating member, one of said first and second pluralities of rollers being axially offset relative to the other of said first or second plurality of rollers, said axially offset ones of said first and second pluralities of rollers being circumferentially spaced apart with a substantially equal inter-roller spacig therebetween, the number of grooves of each of said pluralities of body and drive member helical grooves engaged by said axially offset rollers being equal to about the sum of an integer number plus 0.5, times the number of said axially offset rollers; and
at least one piston mounted for reciprocal movement and operatively engaging said reciprocating member.

15. A fluid-power device, comprising:
a body having a plurality of helical grooves with ridges therebetween formed on an inward facing surface portion thereof;
an axially extending drive member supported for movement relative to said body and connectable to an external device, said drive member having a plurality of helical grooves with ridges therebetween formed on an outward facing surface portion thereof positioned within said body;
a plurality of elongated rollers, each having at least one circumferential ridge;
an axially reciprocating member reciprocally mounted within said body, said reciprocating member rotatably retaining said rollers in fixed axial and circumferential position relative to said reciprocating member during powered operation of the fluid-power device, said rollers being retained said reciprocating member in circumferentially distributed arrangement between said grooved body inward surface portion and said groove drive member outward surface portion with each of a first plurality of said rollers and a second plurality of said rollers in seated engagement with both said grooved body inward surface portion and said grooved drive member outward surface portion for transmitting force between said body, drive member and reciprocating member, said ridge of each of said rollers being positioned for rolling travel in the corresponding grooves of said body and said drive member, said first plurality of rollers and said second plurality of rollers being alternately distributed about the circumference of said reciprocating member, one of first or second pluralities of rollers being axially offset relative to the other of said first or second plurality of rollers, the number of said plurality of drive member helical grooves and the number of said plurality of body helical grooves each being equal to about the sum of an integer number plus 0.5, times the number of equally spaced circumferentially adjacent positions for rollers for engagement therewith; and
at least one piston mounted for reciprocal movement and operatively engaging said reciprocating member.

16. A fluid-power device comprising:
a body having a plurality of helical grooves with ridges therebetween formed on an inward facing surface portion thereof;
an axially extending drive member supported for movement relative to said body and connectable to an external device, said drive member having a plurality of helical grooves with ridges therebetween formed on an outward facing surface portion thereof positioned within said body;
a plurality of elongated rollers, each having at least one circumferential ridge;
an axially reciprocating member reciprocally mounted within said body, said reciprocating member rotatably retaining said rollers in fixed axial and circumferential position relative to said reciprocating member during powered operation of the fluid-power device, said rollers being retained by said reciprocating member in circumferentially distributed arrangement between said grooved body inward surface portion and said grooved drive member outward portion with each of a first plurality of said rollers and a second plurality of said rollers in seated engagement with both saidgrooved body inward surface portion and said grooved drive member outward surface portion for transmitting force between said body, drive member and reciprocating member, said ridge of each of said rollers being positioned for rolling travel in the corresponding grooves of said body and said drive member, said first plurality of rollers and said second plurality of rollers being alternately distributed about the circumference of said reciprocating member, one of said first and second pluralities of rollers being axially offset relative to the other of said first or second plurality of rollers, said circumferntially adjacent ones of said axially offset rollers of said first and second pluralities of rollers being axially offset relative to each other by about 0.5 times the axial spacing between said roller ridges of said axially offset rollers; and at least one piston mounted for reciprocal movement and operatively engaging said reciprocating member.

17. A fluid-power device, comprising:

a body having a plurality of helical grooves with ridges therebetween formed on a radially inward facing surface portion thereof, said grooved body inward facing surface portion having a first pitch diameter and said body helical grooves having a first lead;

an axially extending drive member supported for movement relative to said body and connectable to an external device, said drive member having a plurality of helical grooves with ridges therebetween formed on a radially outward facing surface portion thereof disposed within said body and confronting said grooved body inward surface portion, said grooved body inward surface portion and said grooved drive member outward surface portion defining a circumferential space therebetween, said grooved drive member outward surface portion having a second pitch diameter and said drive member helical grooves having a second lead, said drive member helical grooves having a hand turn opposite the hand turn of said body helical grooves and having substantially the same axial pitch as said body helical grooves;

a plurality of elongated rollers circumferentially disposed in said circumferential space and having a plurality of circumferential ridges with an axial pitch corresponding to the axial pitch of said body and said member helical grooves, circumferentially adjacent ones of said rollers being axially offset in alternating axial directions relative to each other, said rollers having a pitch diameter sized substantially according to the relationship:

roller pitch = first pitch diameter − second pitch diameter; diameter;

an axially reciprocating member reciprocally mounted within said body, said reciprocating member rotatably retaining said rollers in fixed axial and circumferential position relative to said reciprocating member during powered operation of the fluid-power device, said reciprocating member further retaining said rollers in circumferentially distributed positions in said circumferential space with each of said rollers in seated engagement with both said grooved body inward surface portion and said grooved drive member outward surface portion for transmitting force between said body, drive member and reciprocating member, each ridge of said rollers being positioned for rolling travel in corresponding grooves of said body and said drive member; and at least one piston mounted for reciprocal movement and operatively engaging said reciprocating member.

18. The device of claim 17, wherein said rollers are circumferentially spaced apart with substantially equal inter-roller spacing therebetween.

19. The device of claim 18 wherein number of said drive member helical grooves and said body helical grooves are each equal to about the sum of an integer number plus 0.5, times the number of said rollers.

20. The device of claim 19, wherein said circumferentially adjacent ones of said rollers are axially offset relative to each other by about 0.5 times the axial pitch of said body and said number helical grooves.

21. The device of claim 20 wherein said circumferentially adjacent ones of said rollers are diametrically sized to be in generally nested arrangement with each other, said circumferentially adjacent ones of said rollers being spaced apart out of driving engagement with each other.

22. The device of claim 17 wherein the number of said drive member helical grooves and the number of said body helical grooves are each equal to about the sum of an integer number plus 0.5, times the number of equally spaced circumferentially adjacent positions for rollers.

23. The device of claim 17 wherein said circumferentially adjacent ones of said rollers are axially offset relative to each other by about 0.5 times said axial pitch of said body and said member helical grooves.

24. The device of claim 23 wherein said circumferentially adjacent ones of said rollers are circumferentially positioned in generally nested arrangement with each other and circumferentially spaced apart sufficient to be out of driving engagement with each other.

25. The device of claim 17 wherein the lead of said body helical grooves and said drive member helical grooves are selected substantially according to the relationship:

groove lead = groove axial pitch × number of grooves.

26. The device of claim 17 wherein said reciprocating member includes a plurality of spindles extending into said circumferential space and circumferentially distributed therein about said drive member, said spindles having one of said circumferentially distributed rollers coaxially and rotatably retained thereon and retained against axial movement relative to said spindles, said spindles being axially retained by said reciprocating member to prevent axial movement of said spindles relative to said reciprocating member during powered operation of the fluid-power device, circumferentially adjacent ones of said spindles corresponding to said axially offset circumferentially adjacent ones of said rollers being positioned axially offset relative to aach other.

27. The device of claim 26 wherein every other one of said axially offset circumferentially adjacent ones of said spindles includes spacer means for holding said spindle at a fixed axial offset position relative to the immediately adjacent other ones of said spindles.

28. The device of claim 26 wherein said rollers each have a longitudinally extending substantially coaxial roller bore therethrough rotatably receiving one of said spiundles, said axial bore being defined by an interior sidewall, corresponding ones of said roller bore sidewalls and spindles having formed thereon a plurality of confronting and corresponding ball races defining a plurality of ball channels extending circumferentially thereabout, and the device further includes a plurality of balls seated in said ball channels to restrict axial movement of said rollers relative to said spindles while permitting free rotation of said rollers on said spindles.

29. The device of claim 26 wherein each of said spindles is supported by a coaxially extending support arm and said reciprocating member includes a sleeve portion having a plurality of circumferentially spaced apart bore holes therein, said spindle support arms being disposed in said sleeve bore holes.

30. The device of claim 29 wherein at least one or more of said spindle support arms are selectively and adjustably axially movable in said sleeve bore holes, and the device further includes means for selectively and adjustably axially moving said movable spindle support arms in an axial direction relative to the others of said spindle support arms within at least a limited range to axially move said rollers rotatably retained on said movable spindles relative to said rollers rotatably retained on the other of said spindles and thereby eliminate backlash resulting from said rollers coacting with said body and drive member helical grooves as said piston moves from one axial direction to the other within said body as it reciprocates.

31. The device of claim 30 wherein said movable spindle support arms and said sleeve portion bore holes are correspondingly threaded, and said movable spindle support arms are adjustably axially moved by rotation thereof, and the device further includes means for locking said movable spindle support arms against rotation during powered operation of the fluid-power device.

32. The device of claim 31 wherein said sleeve portion bore holes extend fully therethrough and said movable spindle support arms have an end portion projecting out of said bore holes, and wherein said lock means includes a locking plate attached to said reciprocating member and adjustment means for selectively moving said locking plate axially to apply an adjustable axial locking force on said support arm extending end portions of said movable spindle support arms to lock said support arms against rotation during powered operation of the fluid-power device without applying a rotary force thereto.

33. The device of claim 30 wherein at least one or more of said spindle support arms are axially fixedly retained within their corresponding sleeve bore holes, with said movable support arms and said fixed support arms being circumferentially alternately positioned.

34. A fluid-power device, comprising:
a body;
an axially extending drive member supported for movement relative to said body and connectable to an external device, one of said body or said device member having a plurality of helical grooves with ridges therebetween formed on a surface portion thereof positioned within said body;
a plurality of rollers, each having at least one circumferential ridge;
an axially reciprocating member reciprocally mounted within said body, said reciprocating member rotatably retaining said rollers in fixed axial and circumferential position relative to said reciprocating member during powered operation of the fluid-power device, said rollers being retained by said reciprocating member in circumferentially distributed arrangement in seated rolling engagement with said grooved surface portion for transmitting force between said reciprocating member and th one of said body or said drive member having said grooved surface portion, said ridge of each of said rollers being positioned for rolling travel in a corresponding groove of said grooved surface portion, with circumferentially adjacent ones of said rollers being axially offset relative to each other so as to position said ridge of each said roller in a different one of said helical grooves of said grooved surface portion than the corresponding ridges of the two immediately adjacent rollers are positioned;
means for transmitting torque between said reciprocating member and the other of said body or, said drive member; and
at least one piston mounted for reciprocal movement and operatively engaging said reciprocating member.

35. The device of claim 34 wherein said rollers are circumferentially spaced apart with substantially equal inter-roller spacings therebetween, and the number of said plurality of helical grooves engaged by said rollers is equal to about the sum of an integer number plus 0.5, times the number of said rollers.

36. The device of claim 35 wherein said rollers each have a plurality of said roller ridges and said circumferentially adjacent ones of said rollers are axially offset relative to each other by about 0.5 times the axial spacing between said roller ridges.

37. The devioe of claim 34 wherein said rollers are circumferentially spaced apart, and the number of said plurality of helical grooves is each equal to about the sum of an integer number plus 0.5, times the number of equally spaced circumfererntially adjacent positions for rollers for engagement therewith.

38. The device of claim 34 wherein said reciprocating member includes a plurality of spindles each rotatably and coaxially retaining at least one roller of said rollers and positioned adjacent to said grooved surface portion, said spindles being circumferentially distributed about said grooved surface portion to position said rollers in seated rolling engagement therewith, said spindles retaining said rollers against axial movement relative thereto, said spindles being retained by said reciprocating member to prevent axial movement of said splindles relative to said reciprocating member during powered operation of the fluid-power device.

39. The device of claim 38, wherein said rollers retained on said spaindles each have a longitudinally extending substantially coaxial roller bore therethrough rotatably receiving one of said spindles, said axial bore being defined by an interior sidewall, corresponding ones of said roller bore sidewalls and spindles having integrally formed thereon a plurality of confronting and corresponding ball races defining a plurality of ball channels extending circumferentially thereabout, and the device further includes a plurality of balls seated in said ball channels to restrict axial movement of said rollers relative to said spindles while permitting free rotation of said rollers on said spindles.

40. The device of claim 39 wherein said rollers retained on said spindles each is defined by a plurality of rings disposed on one of said spindles, each of said rings having a radially outward facing surface portion shaped to form in combination with the other of said plurality of rings a plurality of said roller ridges with a circumferential groove between adjacent ridges.

41. The device of claim 40 wherein said rings having first and second axially outward oppositely facing sidewalls each with an axially outward opening circumferential ball groove formed thereon, said first and second sidewall ball grooves being axially spaced apart so that said ring ball grooves on adjacent first and second ring sidewalls of adjacent pairs of said rings define one of said roller ball races.

42. The device of claim 38, wherein each of said spindles is supported by a support arm and said reciprocating member includes a sleeve portion having a plurality of circumferentially spaced apart bore holes therein, said spindle support arms being disposed in said sleeve bore holes.

43. The device of claim 38 wherein each of said spindles has an attached end portion connected to said reciprocating member and a free end portion positioned in a circumferential space between said grooved surface portion and the other one of said body or drive member, said spindle free end portions being in circumferentially distributed arrangement within said space about said grooved surface portion, said spindles each having at least one roller of said rollers rotatably and coaxially retained on said free end portion with said free end portion providing a cantilevered support and retaining said roller thereon against axial movement relative to said free end portion.

* * * * *

UNITED STATES PATENT AND TRADEMARK OFFICE
CERTIFICATE OF CORRECTION

PATENT NO. : 4,846,007

DATED : July 11, 1989

INVENTOR(S) : Paul P. Weyer

It is certified that error appears in the above-identified patent and that said Letters Patent is hereby corrected as shown below:

In claim 2, column 27, line 40, delete "load" and substitute therefor --lead--.
In claim 6, column 27, line 67, delete "circumferentailly" and substitute therefor --circumferentially--.
In claim 7, column 28, line 11, delete "having" and substitute therefor --have--.
In claim 10, column 28, line 37, delete "lest" and substitute therefor --least--.
In claim 14, column 29, line 39, delete "and" and substitute therefor --or--, line 44, delete "spacig" and substitute therefor --spacing--.
In claim 15, column 30, line 5, delete "groove" and substitute therefor --grooved--.
In claim 16, column 30, lines 40-41, delete "at least one circumferential ridge" and substitute therefor --a plurality of circumferential ridges--.
In claim 16, column 30, line 51, before "portion" insert
--surface--; line 53, delete "saidgrooved" and substitute therefor --said grooved--; line 57, delete "said ridge of each" and substitute therefor --each said ridge--; line 63, delete "and" and substitute therefor --or--.

UNITED STATES PATENT AND TRADEMARK OFFICE
CERTIFICATE OF CORRECTION

PATENT NO. : 4,846,007

DATED : July 11, 1989

INVENTOR(S) : Paul P. Weyer

It is certified that error appears in the above-identified patent and that said Letters Patent is hereby corrected as shown below:

In claim 26, column 32, line 45, delete "aach" and substitute therefor --each--.
Claim 28, column 32, line 56, delete "spiundles" and substitute therefor --spindles--.
Claim 31, column 33, line 21, before "means" insert --lock--.
In claim 34, column 33, line 45, delete "device" (2nd occurr) and substitute therefor --drive--, line 60, delete "th" and substitute therefor --the--.
In claim 34, column 34, line 4, delete "or," and substitute therefor --or--.
In claim 37, column 34, line 20, delete "devioe" and substitute therefor --device--, line 24, delete "circumfererntially" and substitute therefor --circumferentially--.
In claim 38, column 34, line 35, delete "splindles" and substitute therefor --spindles--.
In claim 39, column 34, line 39, delete "spaindles" and substitute therefor --spindles--.

Signed and Sealed this

Twentieth Day of November, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,846,007
DATED : July 11, 1989
INVENTOR(S) : Paul P. Weyer

It is certified that error appears in the above-identified patent and that said Letters Patent is hereby corrected as shown below:

On the cover page, designating the inventor, following "Paul P. Weyer" delete "48811 - 128th Ave. S.E., Enumclaw, Wash. 98022" and substitute therefor --48811 - 284th Ave. S.E., Enumclaw, Wash. 98022--.

Signed and Sealed this

Nineteenth Day of November, 1991

Attest:

HARRY F. MANBECK, JR.

*Attesting Officer*     *Commissioner of Patents and Trademarks*